May 2, 1950  E. J. SVENSON  2,505,809
HYDRAULIC ACTUATOR MECHANISM
Filed Nov. 7, 1946  10 Sheets-Sheet 1

INVENTOR.
Ernest J. Svenson
BY Cox & Moore
ATTORNEYS.

May 2, 1950 E. J. SVENSON 2,505,809
HYDRAULIC ACTUATOR MECHANISM
Filed Nov. 7, 1946 10 Sheets-Sheet 2
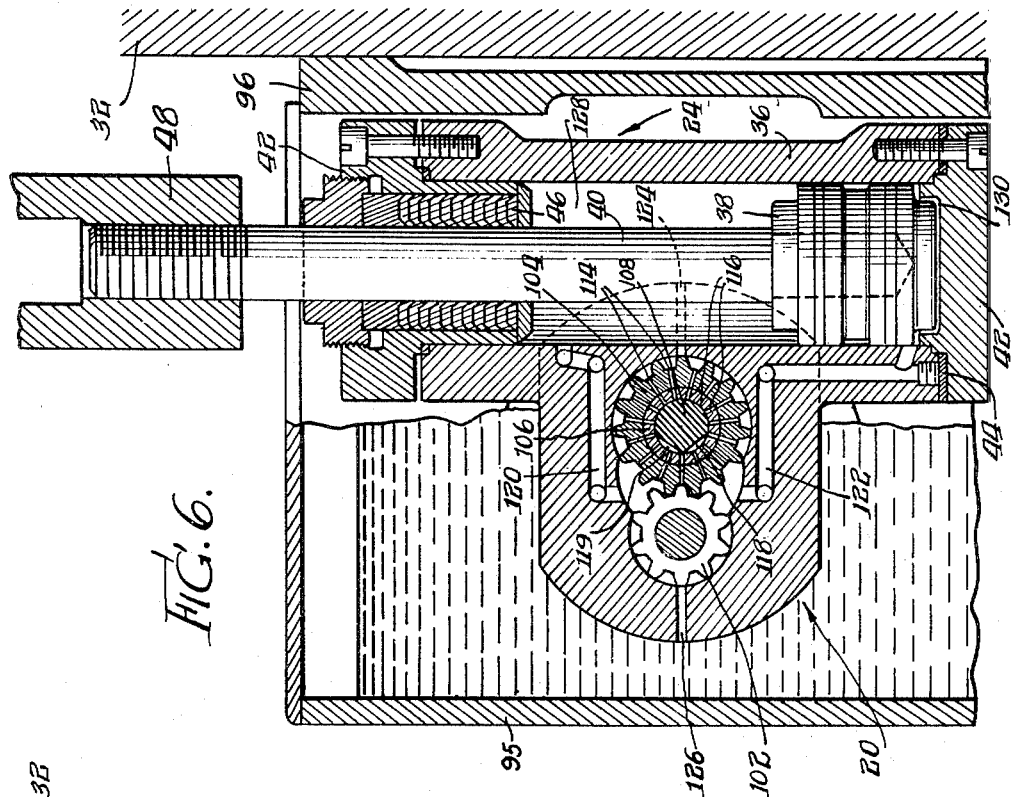
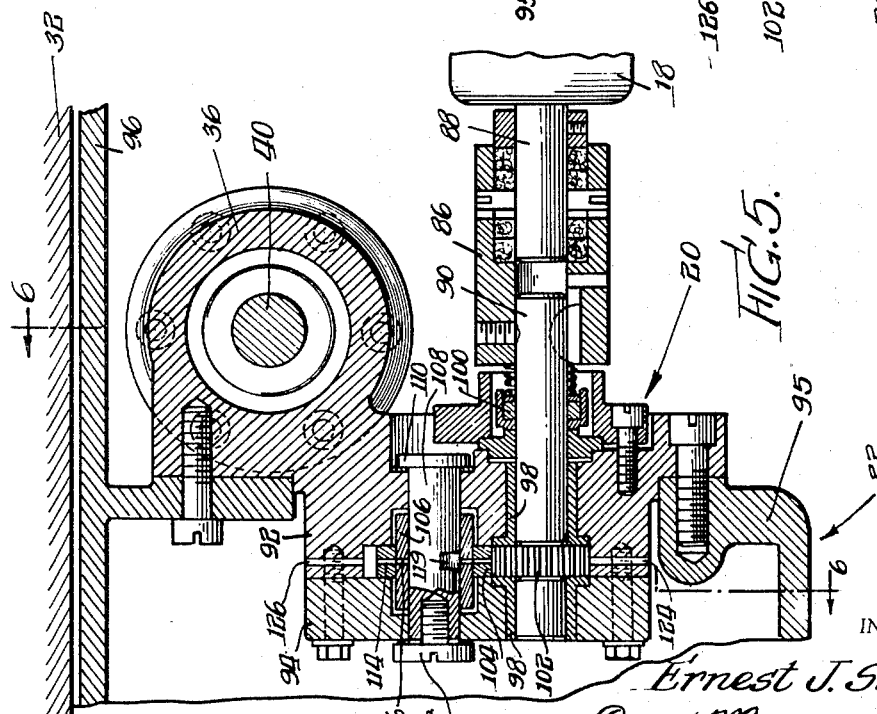
INVENTOR.
Ernest J. Svenson
By Cox & Moore ATTORNEYS.

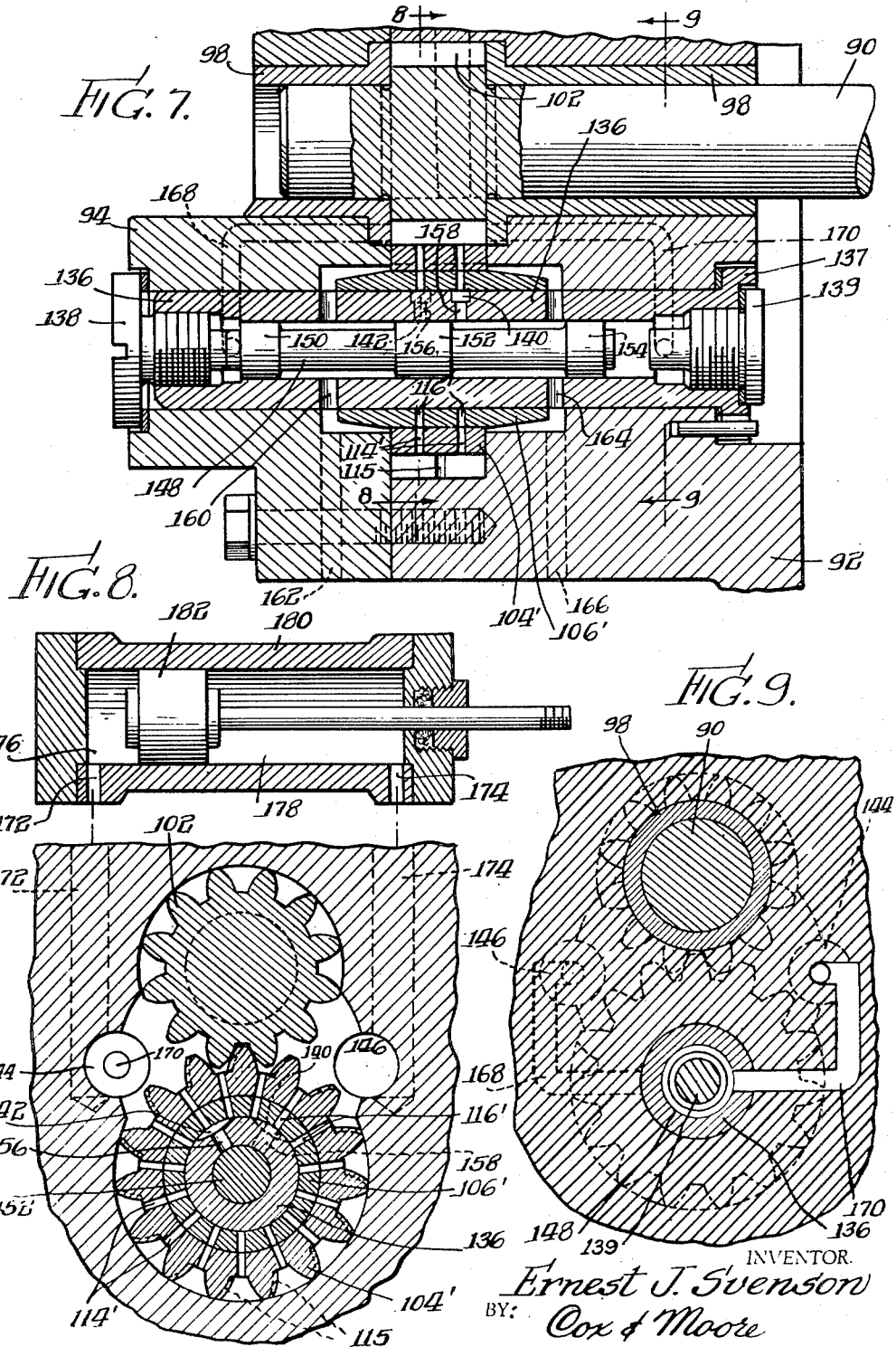

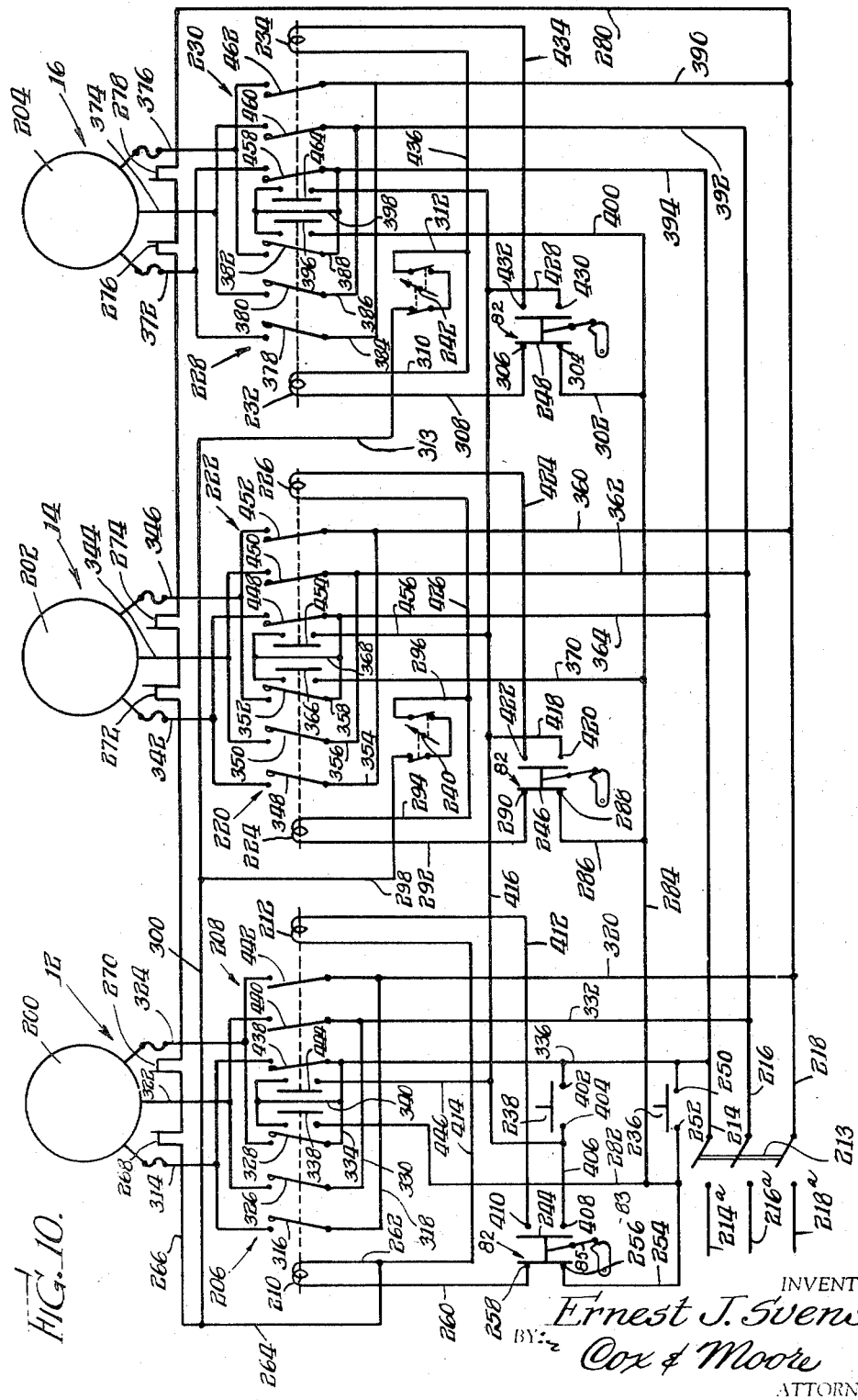

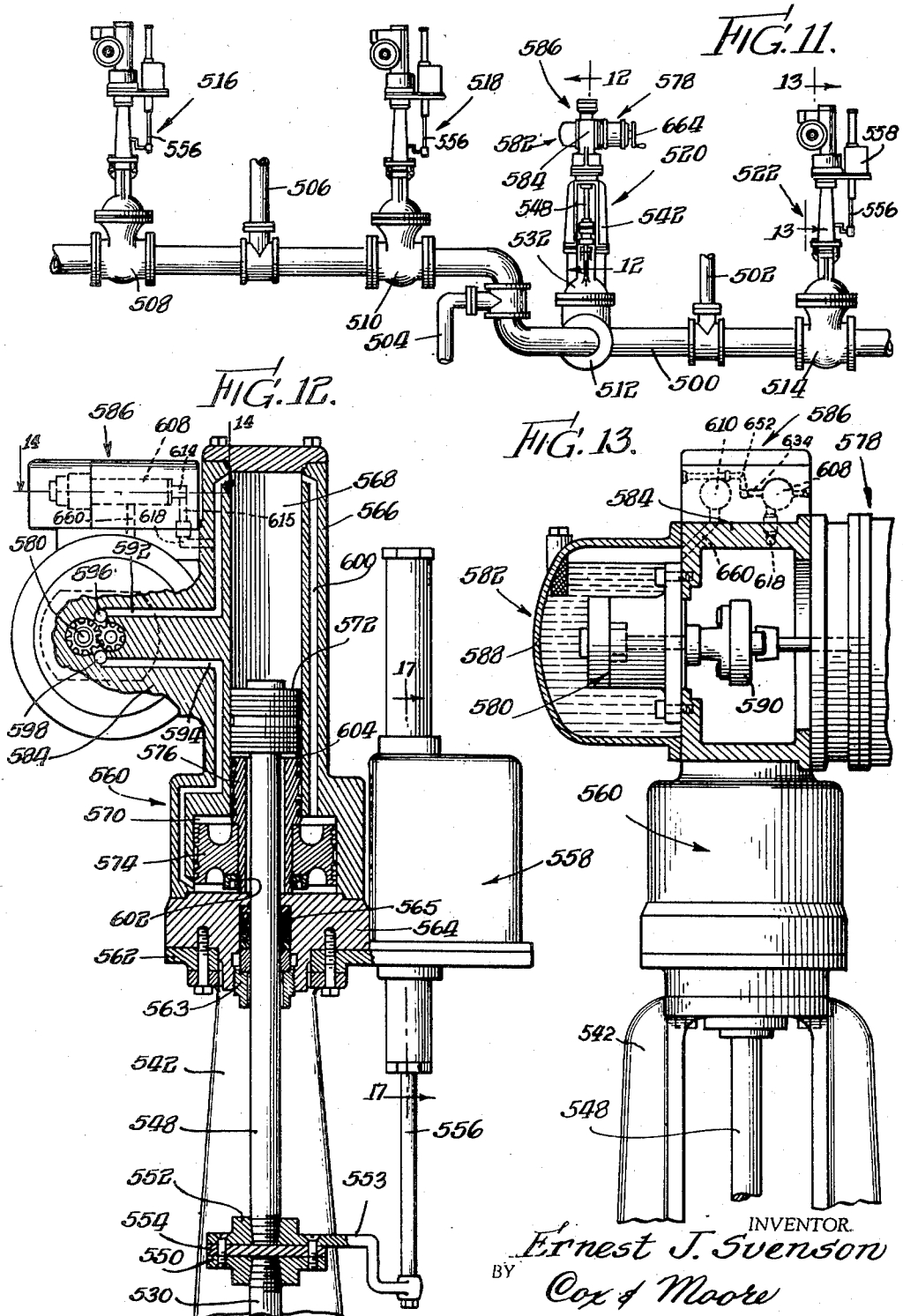

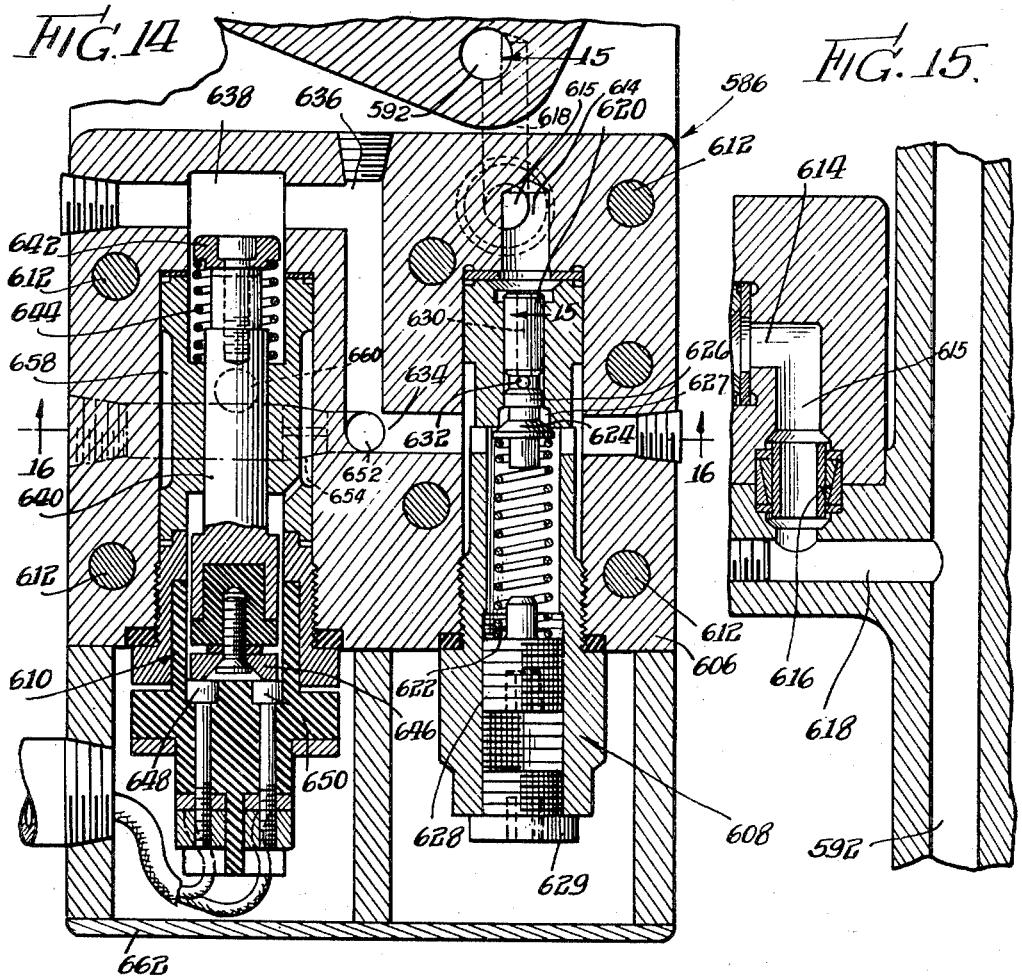
FIG. 14
FIG. 15.
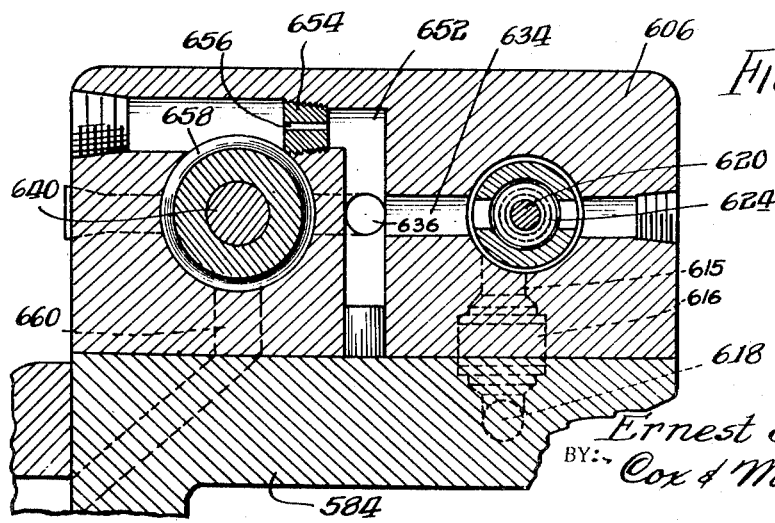
FIG. 16.

May 2, 1950  E. J. SVENSON  2,505,809
HYDRAULIC ACTUATOR MECHANISM
Filed Nov. 7, 1946  10 Sheets-Sheet 7
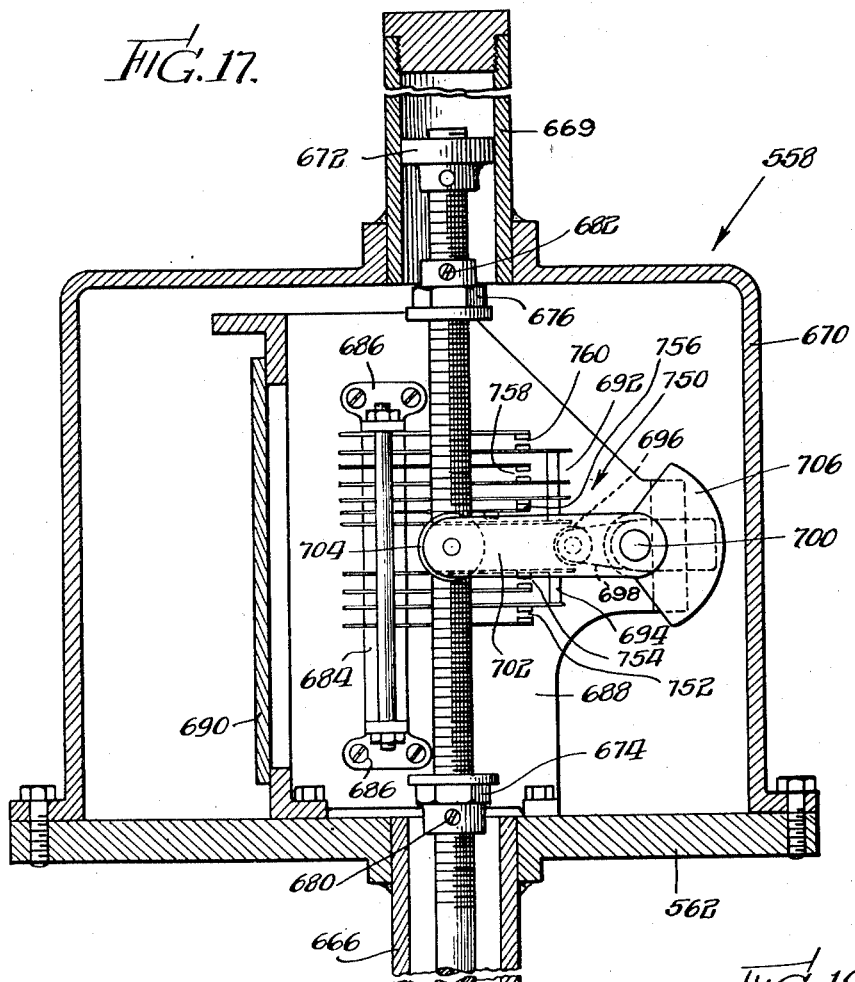
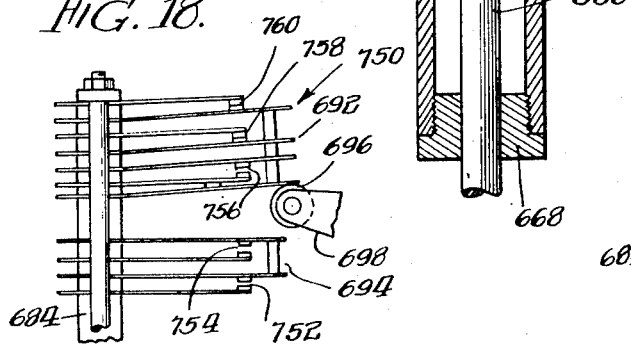
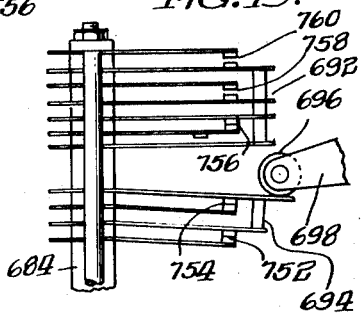
INVENTOR.
Ernest J. Svenson
BY: Cox & Moore
ATTORNEYS.

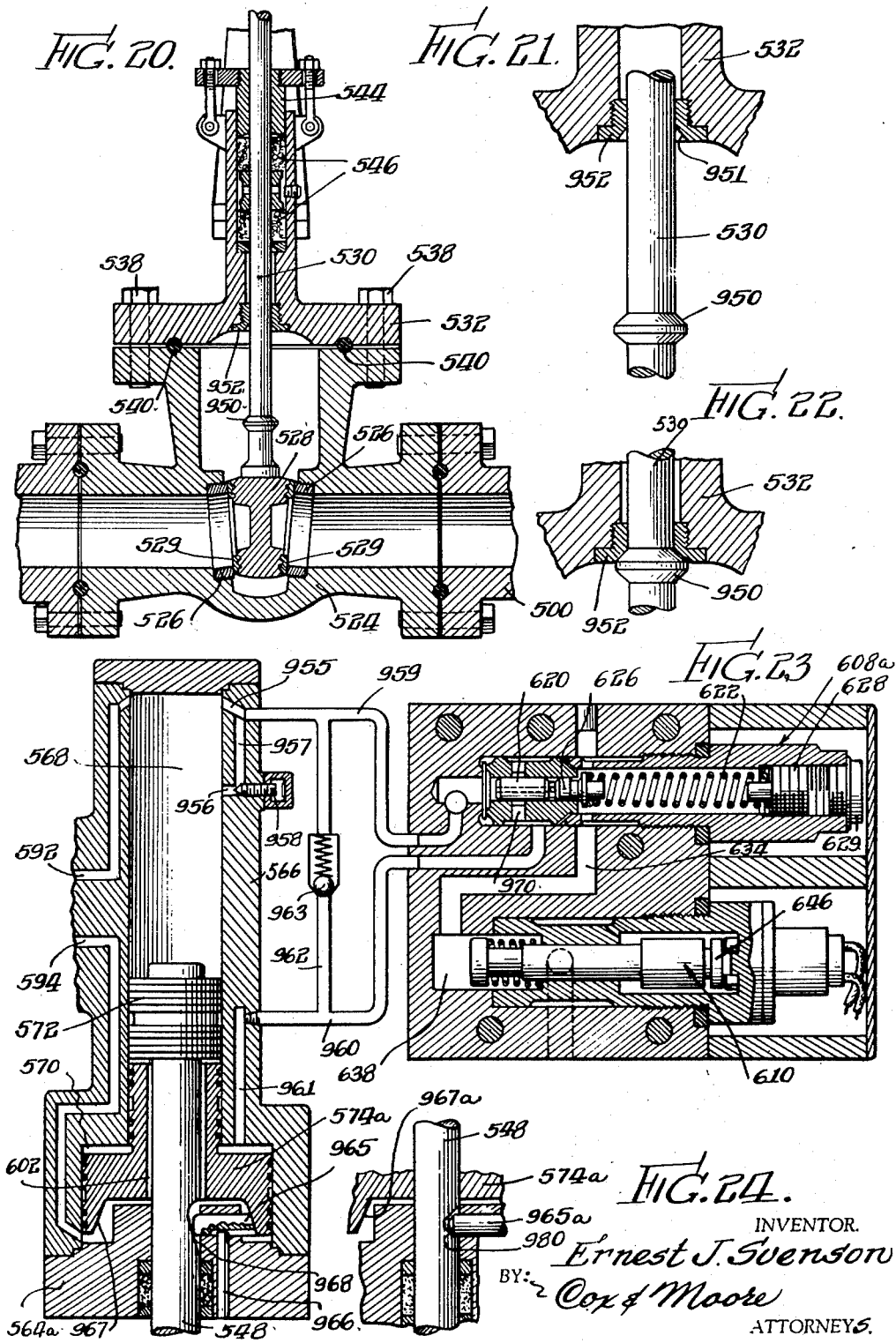

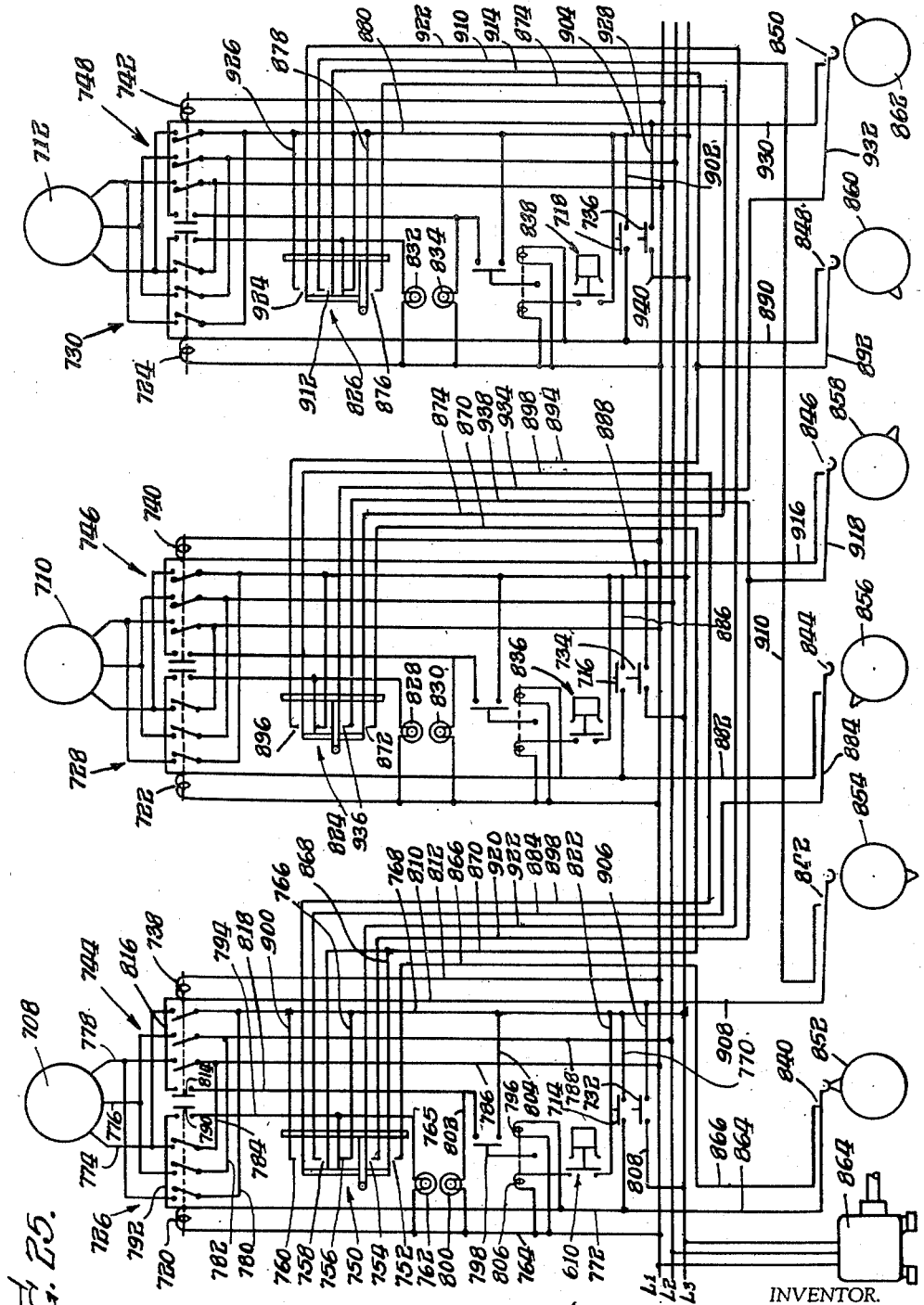

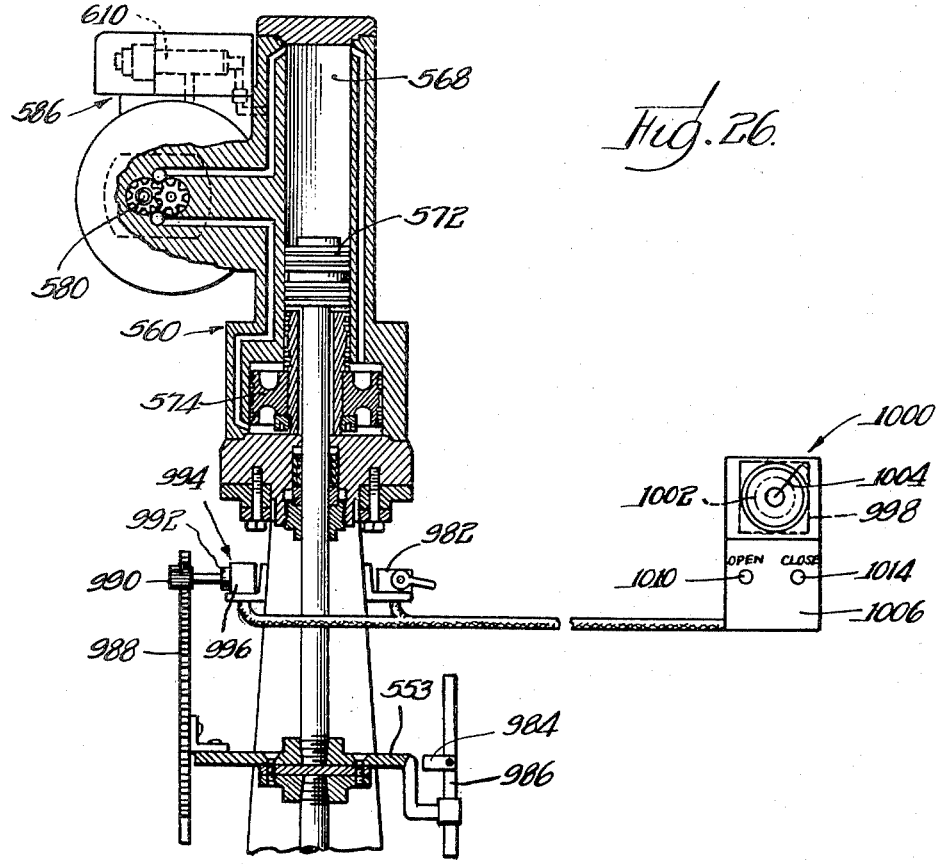
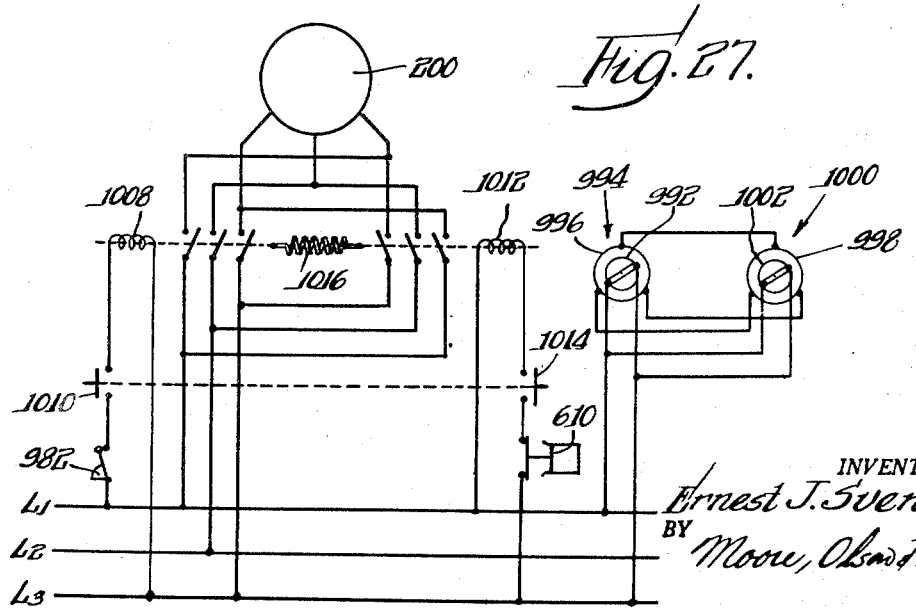

Patented May 2, 1950

2,505,809

UNITED STATES PATENT OFFICE 2,505,809

HYDRAULIC ACTUATOR MECHANISM

Ernest J. Svenson, Rockford, Ill., assignor to Odin Corporation, Chicago, Ill., a corporation of Illinois Application November 7, 1946, Serial No. 708,339

31 Claims. (Cl. 60—52)

This invention relates to hydraulic actuator mechanisms, more particularly of the type which may be used for shifting or propelling various machine elements or parts.

It is an object of the invention to provide a hydraulic actuator mechanism of simplified construction which will accurately, efficiently and economically shift or propel various machine parts, and which may be used to supplant more complicated mechanical mechanisms heretofore used for like purposes.

A further object of the invention is to provide a hydraulic actuator mechanism which may be used to shift machine elements or parts in timed relation to the operation of other parts or elements including other hydraulic actuator mechanisms; but wherein the operations in each instance may be readily and simply controlled by the operator either directly or remotely, as by the manipulation of a push button, control knob or the like. In accordance with the invention simple electrical means may be utilized for correlating and timing the movements of the actuator, thereby dispensing with complicated mechanical interlocking mechanisms.

A further object of the invention is to provide a hydraulic actuator mechanism of the type stated which may be readily adapted for the shifting of machine parts which are subjected to unusual, severe or specialized operating conditions. For example, and as will hereinafter be set forth, the invention may be used for the shifting of valves or the like subjected to extreme variations in temperature, and wherein the valve must be closed with a predetermined accurately controlled pressure, and wherein additional force is required for breaking the valve away from its seat initially upon the valve-opening operation.

A still further object of the invention is to provide for use with hydraulic mechanisms of the type stated, a new and improved pump construction.

The hydraulic actuator mechanism of the invention comprises in general a reversible power source such as an electric motor, fluid pumping means such as a gear pump driven thereby, and a reciprocable hydraulic actuator propelled by the pumped liquid and adapted to be connected to the machine part or element to be shifted. Suitable electrical control means are provided for controlling the movements of the power source or motor, and in certain instances for insuring that the operation of the mechanism will take place in predetermined timed relation with the operation of other machine parts or similar hydraulic operating mechanisms.

A still further object of the invention is to provide, in a hydraulic actuator mechanism of the type defined, improved remote control and indicating means for controlling and indicating the shifting of the actuated machine part.

Various objects, advantages and features of the invention other than those hereinbefore specifically referred to, will appear from the following specification when taken in connection with the accompanying drawings wherein certain preferred embodiments of the invention are illustrated.

This application is a continuation-in-part of my prior copending application now abandoned, Serial No. 271,444, filed May 3, 1939, and entitled "Hydraulic actuator mechanism".

In the drawings, wherein like reference numerals refer to like parts throughout:

Fig. 5 is a detail sectional view of the pump structure and associated parts, taken on the line 5—5 of Fig. 2.

Fig. 6 is a sectional view through the pump and actuator cylinder, taken on the line 6—6 of Fig. 5.

Figs. 7, 8 and 9 are sectional views of a modified form of pump structure, Figs. 8 and 9 being taken on the line 8—8 and 9—9 respectively of Fig. 7.

Fig. 10 shows the wiring diagram for the form of hydraulic mechanism shown in Figs. 1 to 9 inclusive.

Fig. 11 illustrates a modified form or embodiment of the invention as applied to the operation of valves or the like.

Figs. 12 and 13 are sectional detail views, on an enlarged scale, of the actuator structures shown in Fig. 11, and taken on the lines 12—12 and 13—13 respectively thereof.

Figs. 14, 15 and 16 are detail sectional views of a part of the controlling switch mechanism, as embodied in the form of construction shown in Figs. 11, 12 and 13, Figs. 15 and 16 being taken on the lines 15—15 and 16—16 respectively of Fig. 14, and Fig. 14 on line 14—14 of Fig. 12.

Fig. 17 is a sectional view of another part of the switch mechanism as employed in this embodiment of the invention, on the line 17—17 of Fig. 12.

Figs. 18 and 19 are partial views showing the switch device of Fig. 17 in two of its operating positions.

Fig. 20 is a detail sectional view of the lower portions of the valve structure.

Figs. 21 and 22 are detail views showing the mechanism of Fig. 20 in two of its operating positions.

Fig. 23 is a view, somewhat diagrammatic in form, showing a modified form of valve operating structure incorporating locking means for holding the valve in closed position.

Fig. 24 is a detail view illustrating a modified form of locking element.

Fig. 25 is a wiring diagram for the structures shown in Figs. 11 to 24 inclusive.

Fig. 26 is a view similar to Fig. 12, but illustrating a modified form of valve shifting structure incorporating remote control and indicating means, and Fig. 27 is an electrical circuit for the structure of Fig. 26.

In Figs. 1 to 10 of the drawings embodiments of the invention are illustrated wherein the hydraulic actuator mechanism is utilized for shifting printing press rollers, and in Figs. 11 to 27 inclusive embodiments are illustrated for shifting valves or the like, as the invention in certain of its aspects is particularly adapted for uses of this character. However, it is to be understood that other aspects of the invention may be used with various types of structures, including hydraulic actuator mechanisms for shifting other types of machine parts.

Figure 1:
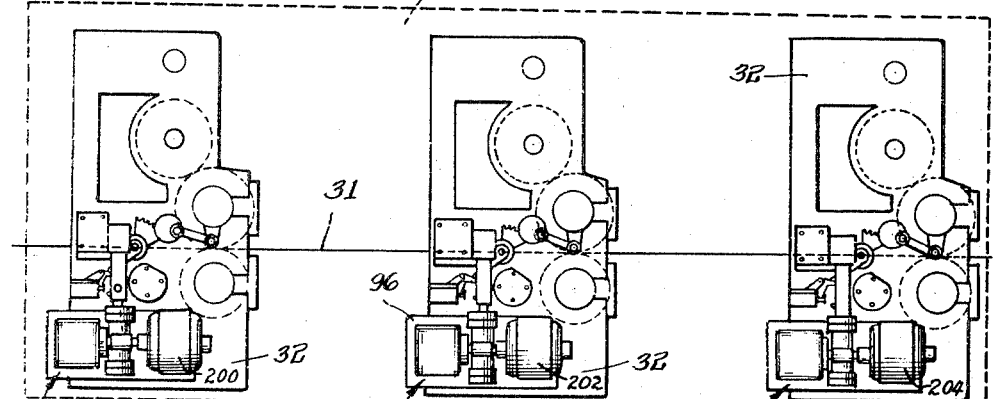
Fig. 1 is a general assembly view somewhat diagrammatic in form, showing the invention in one of its embodiments as applied to the shifting of printing press rollers.
Figure 2:
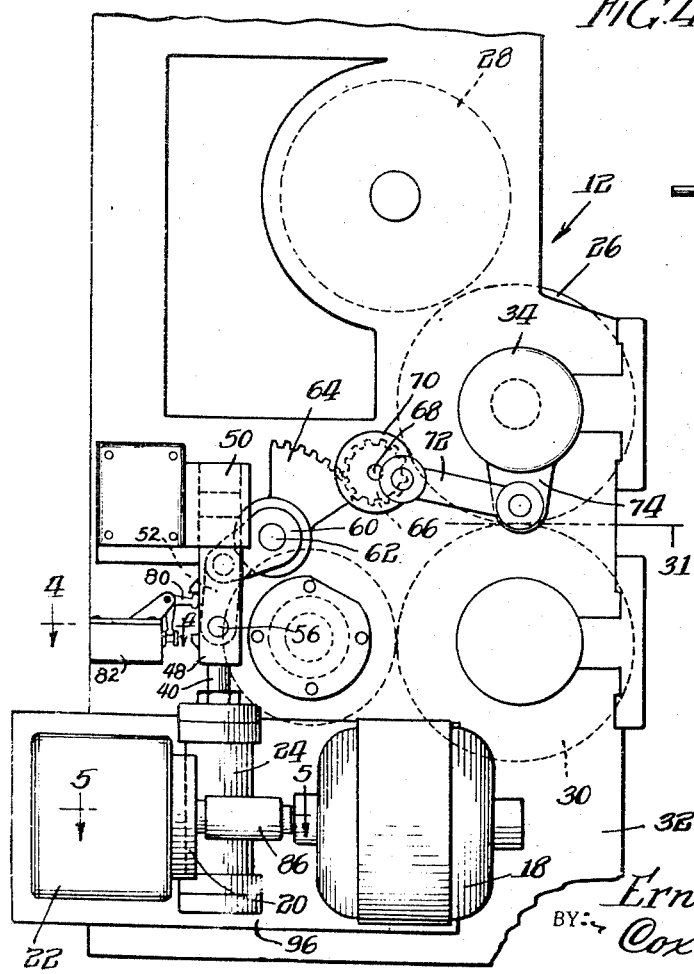
Fig. 2 is a view on an enlarged scale of the hydraulic actuator mechanism as embodied in the structure shown in Fig. 1.

Referring to the embodiments of the invention illustrated in Figs. 1 to 10 inclusive, and first to Figs. 1 through 6, the structure shown comprises a machine diagrammatically indicated at 10, which may be a printing press, paper handling machine or the like having three hydraulic actuator mechanisms indicated at 12, 14 and 16 for shifting the printing or paper engaging cylinders. As best shown in Fig. 2, each of these hydraulic actuator mechanisms comprises in general a reversible electric motor 18 adapted to drive a gear pump or the like 20 mounted within a liquid reservoir 22. The intake and exhaust passages of the pump are hydraulically connected to a reciprocable hydraulic actuator 24 which, through a suitable mechanical linkage, shifts the roller or blanket cylinder 26 upwardly out of engagement with the pressure cylinder 30 or downwardly into engagement with said pressure cylinder 30 and associated paper supporting web 31 as the occasion may require to effect the printing operation.

Referring to each of the hydraulic actuators more specifically, frame brackets 32 at each side of the machine rotatably support a bushing 34 which eccentrically carries the mounting shaft for the shiftable blanket cylinder 26. The plate cylinder 28 and the pressure cylinder 30 are provided with mounting shafts journaled at each end in the brackets 32. The eccentric bushing 34 is rotated or shifted angularly through a predetermined arc to move the blanket cylinder 26 toward and from the pressure cylinder 30 and associated web, as previously stated. The hydraulic actuator 24, which causes this movement of the blanket cylinder, comprises specifically a cylinder 36 cast integrally with the outer end wall of the pump 26, a piston 38 carried by a piston rod 40, and end plates or covers 42 with the usual sealing means or gasket 44 and piston rod packing means 46. The piston rod 40 carries at its outer or upper end a yoke member 48 slidably mounted in a guide bracket 50 secured to the main frame bracket 32. A link 52, Figs. 2 and 3, extends between the spaced arms 54 of the yoke 48 and is pivoted to said arms at its lower end as by a pin 56. The link 52 is pivotally connected by a pin 58 to a crank 60 secured to a shaft 62 journaled in the main frame bracket, shaft 62 being in turn secured to a gear segment 64. The segment 64 meshes with a gear 66 mounted on a stud shaft 68 carried by the frame bracket 32, the stud shaft also carrying a disk 70 to the face of which is pivoted a link 72 pivotally connected to a crank 74 secured to or formed integrally with the eccentric bushing 34. It will be evident that upon reciprocation of the piston 38 the segment 64 will be oscillated through a predetermined arc and this segment in turn will cause oscillation of the eccentric bushing 34 through a predetermined arc and thus move the blanket cylinder 26 toward and from the pressure cylinder 30. It should also be noted that the parts of the mechanism for actuating the eccentric bushing 34 are so proportioned that in either limit of motion of the blanket cylinder the line through the axis of the pivots of the link 72 to the crank 74 and the disk 70 passes through the axis of the stud shaft 68, thereby holding the blanket cylinder in either of its set positions.

Figure 4:
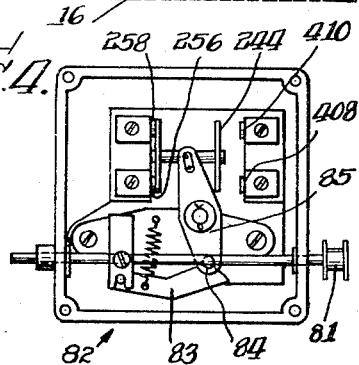
Fig. 4 is a detail view of the switch taken on the line 4—4 of Fig. 2.

One arm 54 of the yoke member 48 is provided with spaced lugs 76 and 78 for alternately engaging one arm of a bell-crank 80, the other arm of which engages the plunger 81 of a limit switch mechanism 82 and thus it will be evident that as the yoke member 48 approaches its limit of movement in either direction, it operates the limit switch mechanism 82. As seen in Fig. 4, the shaft of plunger 81 carries a spring-pressed lever 83 which abuts a pin 84 carried by a snap switch lever 85. As the plunger 81 is reciprocated, the lever 83 causes snap lever 85 to be shifted moving switch 244 into position to close either the contacts 256 and 258 or the contacts 408 and 410, the electrical functions of which will be later described.

Motor 18, which may be of any suitable reversible type, is connected to the pump 20 by any suitable or conventional coupling 86, Figs. 2 and 5, interposed between and secured to the motor shaft 88 and the actuating shaft 90 of the pump 20. The pump 20 comprises a casting 92 formed integrally with the cylinder 36, and a cover plate 94, the pump 20 projecting into and being mounted upon the housing 95 forming the oil reservoir 22. The oil reservoir housing is formed integrally with the support plate 96 for the motor 18.

The pump drive shaft 90 is journaled in bushings 98 and is provided with a suitable liquid seal 100 preventing leakage of the liquid along the shaft. A drive gear 102 is cut integrally with the shaft 90 and meshes with a companion pump gear 104 secured to a rotatable sleeve 106 journaled on a normally stationary but adjustable pin or stud shaft 108 held in position by its shoulder 110 and a cap screw 112. The pump gear 104 is provided with a set of angularly spaced radial passages 114 communicating with similar radial passages 116 in the sleeve 106, the passages 116 being adapted to communicate in sequence with slots or chambers 118 and 119 formed in the shaft 108. Liquid trapped between the teeth of the gears at the meshing position is relieved by the passages 114, 116 and the chambers 118 and 119, the chamber 118 being operative when it is on the outlet or discharge side of the pump as the pump is operating in one direction, and the chamber 119 being operative when it is on the discharge side as the pump is operating in the reverse direction. The chambers relieve the liquid trapped between the teeth of the gears, preventing crushing thereof by allowing it to be relieved back into the exhaust chamber. If desired, the sides of the teeth of the gear 104 may be radially grooved to provide additional relief passages as will be more particularly pointed out hereinafter in reference to the embodiment of the invention shown in Figs. 7, 8 and 9. Also, shaft 108 may be adjusted rotatably to permit the return of liquid from the high to the low pressure side of the pump through the chambers 118 or 119 in regulatable amounts as determined by the adjustment of the shaft. See, for example, Svenson Patents Nos. 1,912,737 and 1,912,738, dated June 6, 1933.

The chamber containing the pump gears 102 and 104 is connected to the actuator cylinder 36 by liquid supplying and discharging ports 120 and 122, the port 120 constituting the inlet and the port 122 the outlet when the pump gears are driven in one direction, and the port 122 constituting the inlet and the port 120 the outlet when the pump gears are driven in the opposite direction. The port 120 extends into communication with the cylinder 36 above the piston as seen in Fig. 6, and the port 122 extends into communication with the cylinder below the piston.

It will be apparent that in a closed hydraulic system or circuit, such as disclosed, wherein the piston rod occupies a portion of the cylinder on one side only of the piston, there exists a difference in the volume of liquid displaced on opposite sides of the piston per unit of piston movement. In order to compensate for this difference in volume there are provided two compensating channels or passages 124 and 126 extending through the pump casting 92 radially with respect to the pump gears and from the pumping chamber into communication with the reservoir 22. When the pump gear 102 is driven in a counterclockwise direction as seen in Fig. 6, liquid is supplied to the pump chamber through the port 120 from the chamber 128 above the piston 38 and forced, under pressure, through the port 122 into the chamber 130 below the piston 38. As the piston 38 moves upwardly or outwardly, less liquid is displaced per unit of movement than is required to fill the space created below the piston by the same unit displacement. Therefore, it may be stated that less liquid is available for the inlet port 120 of the pump than must be supplied to the outlet port 122 of the pump to move the piston 38 upwardly. As the piston 38 moves upwardly, a slight vacuum is thereby created in the inlet port 120 due to this difference in the volume of the displaced liquid on opposite sides of the piston and accordingly when each partially filled space between an adjacent pair of teeth of the pump gears 102 and 104 registers with the ports or passages 124 and 126, additional liquid sufficient to fill these spaces is supplied from the reservoir through these ports 124 and 126.

When the pump drive gear 102 is rotated in the clockwise direction, as seen in Fig. 6, more liquid is supplied to the inlet port 122 of the pump per unit of movement of the piston than is required for the chamber 128 above the piston. This surplus liquid creates a slight pressure in the inlet port 122 and is relieved by liquid passage through the ports 124 and 126 into the reservoir 22.

It will be evident from the description of the form of the invention illustrated in Figs. 1 to 6, that applicant has provided a very simple and efficient means for propelling a machine part, a printing press cylinder in the specific embodiment illustrated, and that by reversal of the driving motor, the direction of movement of such a machine part may be readily controlled without the use of any additional valve mechanisms.

For installations wherein there is a still greater difference in the volume of liquid displaced on opposite sides of the piston per unit of movement, the invention provides the modification illustrated in Figs. 7 to 9. In this form of the invention the pump gear 104' is provided with two axially spaced sets of radial passages 114' leading inwardly from the spaces between the gear teeth, and is secured on the rotatable sleeve 106' provided with similar sets of radial passages 116' communicating with passages 114', the sleeve 106' being rotatably journaled on a second fixed sleeve 136. The teeth of the gear 104' may also be provided on one side with radial slots 115 axially positioned between the sets of passages 114'.

The sleeve 136 is secured to the pump casting 92 and the cover 94 by a flange 137 formed on one end of the sleeve and a threaded plug 138 secured to the other end thereof. A second threaded plug 139 seals the flanged end of the sleeve. The sleeve 136 is provided with peripheral chambers or slots 140 and 142 generally similar to the chambers 118 and 119, previously described, except that they are axially as well as angularly spaced. The slots 140 and 142 communicate through the sets of radial passages 116' and 114' of the sleeve 106' and the gear 104' with the pump chambers 146 and 144. A shiftable valve member 148 is slidably mounted within the sleeve 136 for movement between the threaded plugs 138 and 139, and this member is provided with a plurality of valve heads 150, 152 and 154. The valve head 152 selectively controls communication between radial ports 156 and 158 and the interior chambers 160 and 164 of the sleeve 136, the ports 156 and 158 registering with the peripheral chambers or slots 142 and 140 in said sleeve. Chambers 160 and 164 are in constant communication with the main reservoir 22 by means of passages 162 and 166. The valve head 150 seals the chamber 160 and the valve head 154 seals the chamber 164. Liquid for shifting the valve member 148 is supplied to the interior of the sleeve 136 on the outer sides of the valve heads 150 and 154 by means of ports or passages 168 and 170 which are connected to the ports or passages 174 and 172 through which liquid passes to and from the chambers 178 and 176 of the cylinder 180, to and from the pump chambers 146 and 144.

As the pump driving gear 102 rotates in a counterclockwise direction, as seen in Fig. 8, liquid is withdrawn from the cylinder chamber 178 on the piston rod side of the piston 182 through the port 174 into the pump chamber 146 and supplied under pressure from the pump chamber 144 to the cylinder chamber 176 through the port 172, causing piston 182 to move to the right as seen in Fig. 8. The pressure of the liquid in the port 170, which is in communication with the exhaust pump chamber 144, being greater than the pressure of the liquid in the port 168 which is in communication with the inlet pump chamber 146, the valve member 148 is moved to the left to the position shown in Fig. 7. As the piston 182 moves to the right, there is less liquid available per unit of movement of the piston than is required for the cylinder chamber 176. This deficiency of liquid is compensated for by the drawing of the required liquid into the inlet pump chamber 146 from the main reservoir 22. This liquid is drawn from the reservoir through passageway 166, chamber 164, passageway 158 which is now open, slot 140 and passageways 116' and 114' into the inlet pump chamber 146.

When the pump driving gear 102 is rotated in the opposite direction to effect movement of the piston 182 to the left, as seen in Fig. 8, liquid is withdrawn from the cylinder chamber 176 into the pump chamber 144 through the port 172 and is supplied under pressure to the cylinder chamber 178 from the pump chamber 146 through the port 174. Pump chamber 146 now being on the exhaust or pressure side of the pump, pressure is transmitted through the passageway 168 causing the shifting of valve member 148 to the right, away from the position shown in Fig. 7, opening the passageway 156 and closing the passageway 158. As the actuator piston 182 now moves to the left, the volume of liquid displaced by the piston from the cylinder chamber 176 is greater than that required for the cylinder chamber 178 per unit of piston movement. Passageway 156 now being open, this excess liquid is by-passed from the pump chamber 144 through radial passageways 114' and 116', slot 142, passageway 156, chamber 160, and passageway 162 into the main liquid reservoir.

It will be seen that due to the shiftable valve member 148 the passageways 156 and 158 are closed when on the high pressure side of the pump and open when on the low pressure side thereof to compensate for liquid excess or deficiency. Compensation is made for the differences in volume on the two sides of the actuator piston 182 without any loss of pressure on the pressure side of the pump.

The slots or chambers 140 and 142 not only cooperate with passages 158 and 156 to compensate for liquid excess or deficiency, in the manner stated, but they also act to prevent crushing of the fluid in the manner previously described with reference to chambers 118 and 119. The radial passageways 114' and 116' cooperate with the chambers to prevent crushing of the liquid at the base of the teeth of the gear 104', and the radial slots 115 in effect communicate with passages 114' and 116' to prevent crushing of the fluid at the base of the teeth in the gear 102. The chambers 140 and 142 remain operative to prevent fluid crushing even when the associated passageways 158 and 156 are closed.

Any desired number of the described hydraulic actuating units may be controlled selectively from one pair of push button switches. For the purpose of illustration there is shown in Fig. 1 an installation comprising three such units 12, 14 and 16. Fig. 10 illustrates the schematic electrical circuit for selectively controlling the three units of such installation from a single pair of push button switches. The motors 18 of these units 12, 14 and 16 are schematically represented in Fig. 10 as three-phase electric motors 200, 202 and 204 respectively, although it is to be understood that it is within the contemplation of this invention to employ any suitable type of motor either of alternating or direct current. Forward and reverse switches 206 and 208 actuated by electromagnets 210 and 212 respectively control the forward and reverse connection of the motor 200 to the power supply lines 214, 216 and 218. Forward and reverse switches 220 and 222 actuated by magnets 224 and 226 respectively control the forward and reverse connection of the motor 202 to the power supply lines 214, 216 and 218. Similarly forward and reverse switches 228 and 230 actuated by magnets 232 and 234 respectively control the forward and reverse connection of the motor 204 to the power supply lines 214, 216 and 218. One push button switch 236 is provided to initiate forward operation of all of the units and one push button switch 238 is provided to initiate the reverse operation of all of the units. The units 14 and 16 are provided with disconnecting switches 240 and 242 respectively to keep these units idle, if desired, when the push button switches 236 and 238 are operated. Thus switch 240 determines whether or not the motor 202 will operate and the switch 242 determines whether or not the motor 204 will operate.

Each hydraulic actuator unit includes a limit switch mechanism 82 as previously described. The limit switch mechanism of the actuator unit 12 includes the previously described switch 244 and similarly the actuator units 14 and 16 include switches 246 and 248 respectively. The switches 244, 246 and 248 are actuated by the lugs 76 and 78, Fig. 3, of the actuator unit with which the switches are associated, and as will be seen from Figs. 2 and 3, these limit switches, when tripped by one of the lugs, remain in tripped position until engaged by the companion lug of the pair when the actuator has been moved to its other limiting position.

For the purposes of description, it will be assumed that all of the actuating units are at the limit of their reverse movement and that the limit switches 244, 246 and 248 have accordingly been moved to the positions shown in Fig. 10 to partially complete the circuit to the actuating magnets 210, 224 and 232 of the forward control switches 206, 220 and 228. Accordingly upon actuation of the push button 236, assuming the main switch 213 to have been closed connecting the supply lines 214, 216 and 218 to the main power lines 214a, 216a and 218a, a circuit will be completed to the actuating magnet 210 from the supply line 214 through the contacts 250 and 252 of the push button switch and wire 254, the limit switch contacts 256 and 258, the wire 260 to the actuating magnet 210; and from this magnet through the wire 262, the wire 264, the wire 266, the contacts of overload relays 268, 270, 272, 274, 276 and 278, and wire 280 to the supply line 218. Similarly the closing of push button 236 completes a circuit for the actuating magnet 224 from the push button to the wire 282, to the wire 284, the wire 286, the contacts 288 and 290 of the limit switch 246, and the wire 292 to the actuating magnet 224; and from the magnet 224 to the wire 294, the wire 296, the contacts of the disconnecting switch 240, the wire 298, the wire 300 and the wire 266, the overload relay switches 268 to 278 inclusive and the wire 280 to the supply line 218. The actuating magnet 232 is connected in parallel to the actuating magnet 224 between the wires 284 and 300 by means of the wire 302, the contacts 304 and 306 of the limit switch 248, the wire 308, the wire 310, the wire 312, the contacts of the disconnecting switch 242 and the wire 313. It will therefore be evident that the forward control switches 206, 220 and 228 will be simultaneously moved to closed positions by their respective actuating magnets 210, 224 and 232, and this results in the energization of the motors 200, 202 and 204 and the completion of holding circuits as will now be described.

The motor lead 314 is connected by the switch arm 316 and the wires 318 and 320 to the supply line 218. Similarly the motor leads 322 and 324 are connected by the switch arms 326 and 328, and the wires 330 and 332 and the wires 334 and 336 to the supply lines 216 and 214 respectively. The contact arm 338 of the forward control switch 206 completes a holding circuit for the actuating magnet 210 from the supply line 214 through the wire 336, the wire 334, wire 340, contact arm 338 and the wire 282 to the wire 254 around the push button switch contacts 250 and 252.

Similarly the leads 342, 344 and 346 for the motor 202 are connected by the arms 348, 350 and 352 of the forward control switch 220 to the power supply lines 218, 216 and 214 respectively through wires 354, 356, 358 and wires 360, 362 and 364. The contact arm 366 of the forward control switch 220 completes a holding circuit for the magnet 224 from the supply line 214, by means of the wire 354 from the supply line, the wire 358, a wire 368, the arm 356, a wire 370, wire 284 and the wire 286, contact 288, switch 246, contact 290, wire 292, magnet 224, wire 294, wire 296, switch 240, wire 298, wire 300, wire 266, overload switches 268 to 278 and the wire 280 to the line wire 218. The leads 372, 374 and 376 for the motor 204 are similarly connected by the arms 378, 380 and 382 of the forward control switch 228 to the supply lines 218, 216 and 214 respectively through the wires 384, 386, 388 and the wires 390, 392 and 394. The contact arm 396 of the forward control switch 228 completes the holding circuit for the actuating magnet 232 from the supply line 214 through the wire 394, the wire 388, the wire 398, the arm 396, the wire 400, the wire 284, wire 302, contact 304, switch 248, contact 306, wire 308, magnet 232, wire 310, wire 312, switch 242, wire 313, wire 300, wire 266, overload switches 268 to 278 and wire 280 to the line wire 218. Any other desirable means may be employed in place of the contact arms 338, 366 and 396 for completing other conventional circuits for locking the actuating magnets 210, 224 and 232 in their switch closing position.

Figure 3:
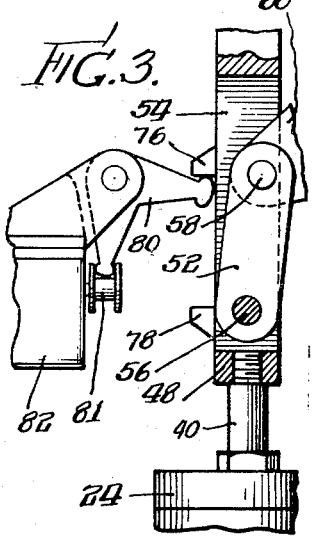
Fig. 3 is a detail view of the actuating mechanism for the control or limit switch.

From this description of the forward control circuits it will be evident that the disconnecting switches 240 and 242 being in their "on" position, the momentary closing of the push button switch 236 results in the energization of all of the motors for operation in the forward direction. These motors 200, 202 and 204 drive their respective hydraulic pumps which in turn drive their hydraulically associated pistons in the forward direction. As each piston reaches its limit of movement in the forward direction, the limit switch associated therewith will be moved to its opposite position. For example, at the end of the upper stroke of the piston 38 or 182 of the unit 12 the lug 78 will engage and operate the bell-crank 80 which in turn will move the plunger 81 to the right as seen in Figs. 2 and 3, thereby moving the switch 244, Fig. 10, to the right. This movement of the switch 244 breaks the circuit between contacts 256 and 258, thereby breaking the holding circuit for the actuating magnet 210 which in turn allows the forward control switch to move to open position, breaking the circuit to the motor. Similarly the limit switches 246 and 248 when actuated break the holding circuits to the actuating magnets 224 and 232, and these magnets in turn deenergize the circuits for the motors 202 and 204. It is to be noted that the holding circuits for the actuating magnets 210, 224 and 232 are all arranged in parallel so that the breaking of any holding circuit deenergizes only its own associated actuating magnet.

The limit switches 244, 246 and 248 being in their reverse motor position, depression of the reversing push button 238 will complete circuits through these limit switches through the actuating magnets 212, 226 and 234 which operate the reverse control switches 208, 222 and 230. The depression of the push button switch 238 connects supply line 214 to actuating magnet 212 through the switch contacts 402 and 404, wire 406, contacts 408 and 410 of the limit switch 244 and wire 412 to the actuating magnet 212. On the other side of the actuating magnet 212 the circuit is completed through the wire 414, the wire 262, wire 264, wire 266, overload relay contacts 268 to 278, and wire 280 to supply line 218. The circuit for the actuating magnet 226 is completed from the contact 404 of the switch 238 through the wire 416, wire 418, contacts 420 and 422 of the limit switch 246, wire 424, the actuating magnet 226, wire 426, the wire 296, the contacts of the disconnecting switch 240, the wire 298, the wire 300, wire 266 and overload relay switches 268 to 278 and wire 280 to the supply line 218. The circuit to the actuating magnet 234 is completed through the contact 404 of the switch 238 to the wire 416, wire 428, the contacts 430, 432 of the limit switch 248, wire 434, the actuating magnet 234, the wire 436, the wire 312, the contacts of the disconnecting switch 242, the wire 313, the wire 300, the wire 266, overload relay switches 268 to 278, and wire 280 to supply line 218.

Thus the closing of switch 238 causes the reversing magnets 212, 226 and 234 to be energized and these magnets in turn operate the reverse control switches 208, 222 and 230 to cause reverse energization of the motors 200, 202 and 204. The operation of these motors in the reverse direction causes the hydraulic pump gears to be driven in the reverse direction to move the actuated pistons downward as seen in Figs. 1 to 3. More specifically, the switch arms 438, 440 and 442 of the reverse control switch 208 connect the motor leads 314, 322 and 324 to the supply lines 214, 216 and 218 respectively through the wires 336, 332 and 320. It will be seen that the motor leads 314 and 324, which upon operation of the forward control switch 206 were connected to the supply lines 218 and 214 respectively, are now connected by the reverse control switch 208 in opposite phase relation, the lead 314 being connected to the supply lines 214 and the lead 324 being connected to the supply line 218. Hence, upon operation of the control switch 208, the motor will be energized for reverse rotation. The arm 444 of the reverse control switch 208 completes the holding circuit around the push button 238 from the supply line 214 through the wire 336, the wire 334, the wire 340, the arm 444, the wire 446, and the wire 416. This maintains a circuit to the actuating magnet 212 independent of the push button switch 238, the circuit to the magnet being established through wire 406 and contacts 408 and 410, as previously described in reference to the actuation of the push button switch.

In like manner the switch arms 448, 450 and 452 of the reverse control switch 222 connect the motor leads 342, 344 and 346 to the supply lines 214, 216 and 218 respectively through the wires 364, 362 and 360 so as to energize the motor for reverse rotation. The arm 454 of the reverse control switch 222 completes the holding circuit for the actuating magnet 226 around the push button switch 238, this holding circuit being completed from the supply line 214 through the wire 364, the wire 358, the wire 368, switch arm 454, wire 456, and wire 416, the circuit then continuing through wire 418, and contacts 420 and 422 to the magnet, as previously described in reference to the operation of the push button switch 238.

In similar manner the switch arms 458, 460 and 462 of the reverse control switch 230 connect the motor leads 372, 374 and 376 to the supply lines 214, 216 and 218 respectively through the wires 394, 392 and 390 so as to energize the motor 204 for reverse rotation. The arm 464 of the reverse control switch 230 completes the holding circuit from actuating magnet 234 around the push button switch 238, this circuit being completed from the supply line 214 to the wire 394, the wire 388, wire 398, switch arm 464 and wire 416, and then through wire 428 and contacts 430 and 432 to the magnet as previously described.

As each actuated part or piston of the several hydraulic actuating units reaches its original position or lowermost position as seen in Figs. 1 to 3, the lug 76 of each actuating unit engages and actuates the bell-crank 60, Fig. 3, thereby moving the limit switches to their original position, as shown in Fig. 10, whereby the holding circuit for the actuating magnet of the reverse control switch is broken and the circuit to the actuating magnet of the forward control switch partially completed. Each limit switch controls only its own holding circuit, thereby insuring that the deenergization of each motor unit will be under the control of its own limit switch.

In a multiple unit system it is sometimes necessary to maintain the second and third units idle while the first unit operates, or to maintain either the second or third unit idle while the other two units operate. In such a case it is only necessary to manually operate the disconnecting switch 240 or the disconnecting switch 242 to an "off" position. The switch 240, when in "off" position, breaks the circuit to both of the actuating magnets 224 and 226 disconnecting the common wire 298 from the common wire 296. The switch 242, when in "off" position, disconnects both actuating magnets 232 and 234 by breaking the circuit between their common wires 313 and 312. Hence, when the switch 240 or the switch 242 is in "off" position, the motor 202 or the motor 204 will not be operated by the closing of either the push button 236 or the push button switch 238.

In Figs. 11 to 27 there is disclosed a hydraulic actuator system for the control of an installation of valves or the like as in a piping system, which may, for example, be a gasoline or oil refining process, such as the Houdry oil refining or cracking process described in Fortune Magazine, February, 1939, pages 56 to 58. In systems of this type the various valves in the installation must be opened and closed quickly and efficiently in a predetermined timed sequence, and each valve must be closed with a predetermined accurately controlled actuating pressure. Remote control, and remote and accurate indication of the valve position may also be essentials. To overcome "sticking" caused by various operating conditions, additional actuating force must be applied for initially moving or breaking the valve away from its seat to open the valve. Also, while the valve must be firmly retained in closed position when such is required, allowances must be made for the wide temperature variations to which the valve may be subjected, precluding damage resulting from temperature induced expansion of the valve parts. These and other requirements are met by the actuator system provided by the present invention.

More specifically, in piping systems such as above mentioned, the valves are subjected to extreme variations in temperature, but notwithstanding these temperature variations, the valves must positively cut off communication within the conduit system under all conditions of service when in closed position, and at the same time must be actuated positively from fully closed to fully opened position in a minimum of time and without damage to the valve structure. If the valve is positively or mechanically locked in closed or seated position, when the valve is subjected to increased temperature, the expansion of the parts tends to freeze the valve member to its seat or in its guides requiring very high operating forces to break the valve from its seat when the valve is again to be opened, and in some instances actually causing rupture or breakage of the structural parts. In accordance with the invention the valve may be closed with a predetermined controlled pressure, and if desired also locked in closed position. But the locking means is yieldable to permit the necessary expansion of the parts due to temperature changes precluding freezing of the valve seat or rupture of the metal structures.

Although the invention provides means for applying a high initial opening force to the valve member to break the same away from its seat, the forces applied to move the valve member throughout the remainder of its range of travel are of less magnitude reducing wear and pounding of the valve parts and the actuating mechanism. Further, the final closing force applied to the valve member to urge it into closing engagement with its seat may be accurately controlled whereby to apply the proper or desired locking effort to the valve closing operation.

As illustrated in Fig. 11 a multiple valve installation is shown wherein hydraulic actuator mechanisms of the general type previously described, but embodying certain variations and modifications, are provided for moving the valve elements to open and closed positions under the extreme operating conditions discussed; and including simplified controls and interlocking means by which any number of the hydraulic actuating means may be operated in sequence and in timed relation, such interlocking means preventing false operation of any unit if a unit which should have been previously operated has failed to operate at the proper time. Referring more specifically to Fig. 11, the piping system shown may comprise a main pipe line 500 and auxiliary pipe lines 502, 504 and 506 through which various treating agents may be introduced into the main pipe line or through which liquid or fluid therein may be withdrawn. Valves 508, 510, 512 and 514 are provided in the pipe line to control the flow of fluid therethrough and to the various auxiliary pipes. These valves are provided with hydraulic actuating units 516, 518, 520 and 522 respectively.

These hydraulic actuating units may be interconnected for operation in predetermined timed relation as shown schematically in Fig. 25 subsequently to be described. Remote indication of the position of each valve may also be provided, as will hereinafter be set forth in reference to Fig. 25, and also Figs 26 and 27.

Each of the valve structures and their associated hydraulic actuating units 516 through 522 is identical in construction, and therefore the description of one will suffice for all. As shown in Fig. 20, each valve comprises the usual valve housing 524 having removable valve seats 526 adapted to be engaged by the shiftable valve member or head 528 carrying the non-ferrous metal seating rings 529. The valve head 528 is secured to and operated by the valve rod 530. The valve rod 530 extends upwardly from the valve head through the bonnet 532 secured to the valve housing 524 by the screws 538, the bonnet being provided with the usual packing means 540 between the bonnet and the valve housing. The bonnet 532 is extended upwardly (Fig. 11) to provide a yoke 542 which forms the support for the hydraulic actuating unit. The bonnet 532 is provided with a packing nut 544 for retaining the packing means 546 in position in the upper sleeve-like portion of the bonnet about the valve stem 530 to prevent leakage of the fluid along the valve stem.

As best seen in Fig. 12, the valve stem 530 is connected to the actuating piston rod 548 of the actuating unit by coupling rings or collars 550 and 552 between which is interposed a disk 554 of any suitable heat insulating material for preventing transference of heat to the actuator from the valve stem 530. The upper coupling ring 552 is provided with an integral arm 553 extending outwardly from between the arms of the yoke 542 which is adjustably connected at its outer end to the actuating rod 556 of a limit switch interlock mechanism 558. The switch mechanism 558 and the hydraulic actuator 560 are individually mounted on a base plate 562 bolted to the yoke 542. By this method of connecting the hydraulic actuator and the switch mechanism of each actuating unit to the valve structure, it is possible to remove either the hydraulic actuator 560 or the switch mechanism 558 without disturbing the other which is of great importance in certain installations where a number of valves are interlocked together as in the Houdry cracking system previously noted. An adjustable packing nut 563 is threadedly secured to an extension on the actuator end cap 564, for retaining the piston rod packing 565 in place.

Referring more specifically to the actuator unit, main cylinder casting 566 contains two different size cylinder bores 568 and 570, of which the upper bore contains the piston 572 secured to the upper end of the piston rod 548 and the lower bore contains the floating piston 574. The piston 574 is provided with a reduced head portion 576 extending upwardly into the smaller bore 568. Piston 574 and head 567 move as a unit and are provided with suitable sealing rings which form a seal for the fluid pressure during movement of the piston as will later be apparent. Each actuator unit includes a prime mover such as an electric motor 578 (Fig. 13), a pump 580 and fluid reservoir 582, mounted on a support 584 which is preferably cast integrally with the main cylinder casting 566, although it may of course be cast separately and secured in a conventional manner to said cylinder casting. A pressure controlling switch mechanism 586, the function of which will be later described, may also be mounted on the support 584.

The pump 580 may be similar in construction to the pump shown in Figs. 5 and 6 or in Figs 7 to 9, the main casting of the pump forming with the support 584 one wall of the oil reservoir 582, the other walls of which are formed by the housing 588. The pump may be mechanically connected to the motor 578 in the manner shown in Fig. 13, the coupling 590 being enclosed within the support 584. The ports or passages 592 and 594 connect the inlet and outlet ports 596 and 598 of the pump to the upper end of the cylinder bore 568 and to the lower end of the cylinder bore 570, the ports or passages 592 and 594 being formed in the pump casting, the support 584, and the main cylinder casting 566, eliminating the need for any outside piping between the pump and the cylinder. A fluid passage or port 600 extends through the main cylinder casting 566 from the upper end of the cylinder bore 568 to the lower cylinder 570. The enlarged central bore 602 of the piston head 576 provides a fluid passage about the piston rod 548 permitting the fluid to pass from the under side of the piston 574 to the under side of the piston 572.

Assuming the valve to be closed as shown in Fig. 12, upon rotation of the motor in a direction to effect an upward movement of the valve stem 530, the pump 580 will draw fluid which is preferably oil from the cylinder bore 568 above the piston head 572 through the port 592 into the pump port 596 and force fluid through the port 598 and the port 594 into the cylinder bore 570 below the piston 574. Differences in the cylinder volumes on opposite sides of the pistons are compensated for as previously described. The power or floating piston 574 under the force of the fluid moves freely for a predetermined distance determined by the space 604 until the upper end of the head portion 576 strikes the lower wall of the piston 572. It will be evident that this free movement of the piston 574 permits the motor to attain full speed before the piston 574 engages the piston 572, through which piston and the piston rod 548 the upward force of the large piston 574 is initially applied to the valve stem to lift or break the gate valve head 528 from its seats 526.

The piston 574 itself moves only a predetermined selected distance sufficient to free the gate valve from its seats and is then stopped by the upper wall of the cylinder bore 570. The sealing rings for the head portion 576 of the piston 574 prevent the fluid, which now passes through the central bore 602 to the cylinder bore 568 beneath the piston 572, from entering the port or passage 600. The valve gate being now free from its seat and partly open, the only force required to lift the valve is substantially that necessary to overcome the frictional resistance of the valve packings and the weight of the parts involved, and therefore the small piston 572 can now be used to complete the opening of the valve. The piston 572 is moved to complete this opening of the valve by fluid supplied through the port 594 and the central bore 602 of piston head 576 to the under side of the piston 572. Since the area of the under face of the piston 572 is considerably smaller than the under face of the piston 574, and since a smaller volume of fluid will therefore move the piston a greater distance, the piston 572 will move at a suitably faster rate of speed after the piston 574 has completed its movement to free the valve.

As the piston 572 approaches its normal limit of movement in the upward direction, the switch rod 556 will cause the operation of the interlock and switch mechanism 558 to break the circuit to the motor 578 in a manner to be later described. After opening of the valve, the frictional resistance to movement of the parts, and the resistance to circulation of fluid through the several passages or ports may be relied upon to prevent the weight of the valve from moving it toward a closed position.

Upon energization of the motor 578 to effect a closing of the valve, fluid will be withdrawn from the cylinder chamber 568 beneath the piston 572 and from the cylinder chamber 570 beneath the piston 574 through the port 594 to the pump port 598, and forced under pressure through the pump port 596 and the port 592 into the cylinder chamber 568 above the piston 572. Fluid is also forced into the cylinder chamber 570 above the piston 574 from the cylinder chamber 568 through the port 600. This movement of the fluid forces both the pistons 572 and 574 downwardly to effect a closing of the valve.

When the valve gate reaches the seating position, the pressure on the top of the piston 572 builds up to a predetermined value as determined or controlled by the switch mechanism 586, and when the switch mechanism operates the motor 578 is deenergized. This seating pressure may be varied over a wide range to suit different operating conditions and different sized gate valves so as to close the valve gate leak-tight but without jamming or scoring of the valve seat.

More specifically, referring to Figs. 14 to 16, the pressure switch mechanism 586 comprises a main body casting 606 in which is mounted a pressure relief valve structure or device 608 and a normally open pressure switch structure or mechanism 610. The main body casting 606 may be secured to the top of the support 584 in any suitable manner as for example by the screws 612. A port 614 connects the inner end of the relief valve structure 608 to the port 592 of the hydraulic actuator by the fluid coupling 616 and the port 618, the coupling 616 being of suitable leak-proof character and preferably being of a structure described in applicant's Patent No. 2,395,518, dated February 26, 1946. As the valve gate closes, the piston 572 is frictionally retarded and this causes a building up of fluid pressure on the upper side of the piston 572. This increased fluid pressure is transmitted to ports 592, 618 and 614 and acts on the head of a valve stem 620. At a predetermined pressure, as determined by the tension of a compression spring 622, the shiftable valve 624 will be moved from its seat and simultaneously the annular sealing ring 626 formed on the valve stem will be moved from its cylindrical sealing surface into the larger bore 627.

The tension of the spring 622 which determines the pressure at which the valve 624 will operate may be adjusted to a desired value by means of the adjusting screw 628 against which the spring abuts at its lower end, the screw being rendered accessible upon the removal of end closing cap 629.

Upon opening of the valve 624, fluid passes from the port 614 through an axial port 630 and a radial port 632 in the valve stem 620 and past the open annular seal 626 into a port 634.

From the port 634 the fluid passes by means of the port 636 into the chamber 638 at the inner end of the stem 640 of the switch mechanism 610. The pressure of the fluid in the chamber 638 acting on the head 642 of the stem 640 moves the stem outwardly against the force of the compression spring 644, and this movement of the stem causes the contact ring 646 to engage and connect the fixed contacts 648 and 650. The contacts 648 and 650 when connected together cause a breaking of the motor circuit and stop the rotation of the pump.

The port 634 is connected back to the main oil reservoir 582 by a port 652 (Fig. 16, indicated also by dot and dash lines in Fig. 14) having a plug 654 providing a restricted orifice 656, an annular port or chamber 658, and a port 660 extending from the annular port 658 through the main body 606 of the pressure switch mechanism 586 and through the support 584 into the interior of the oil reservoir 582. The restricted orifice 656 serves three purposes, namely: first, to allow a sufficient pressure to be built up in the chamber 638 to operate the switch mechanism 610; secondly, to relieve the pressure in this chamber after the valve 624 has been closed so as to permit the stem 640 of the switch to be returned to its initial position by compression spring 644; and finally, as a fluid overload or by-pass in case of failure of the electric control circuit resulting in the continued operation of the pump after the valve 528 has been seated in which latter case all the fluid delivered by the pump is returned to the oil reservoir through the orifice 656 at a pressure higher than that required to operate the switch mechanism 610.

The contacts of the switch mechanism 610 may be enclosed in a detachable explosion-proof housing 662, which may also be formed to provide a housing for the closing cap 629 which encloses the adjusting screw 628 of the pressure relief valve structure 608. The adjustment of screw 628 determines the force with which valve 528 will be thrust into engagement with its seat.

In addition to the foregoing automatic electric motor operation, each hydraulic actuating unit may be manually operated by means of a hand wheel 664, Fig. 11, mounted on the extending end of the shaft of the motor 578 and operatively connected thereto by any suitable disengageable clutch not shown, by which the hand wheel may be declutched to remain stationary when the motor is running.

Referring to Figs. 17 to 19, the interlock switch mechanism 558 comprises in addition to the operating rod 556, a rod housing 666 welded to and depending from the supporting plate 562 and provided at its lower end with a bearing block 668 for the rod 556. A rod housing 669 welded to the dome of the detachable housing 670 forms a guide for a collar 672 secured to the upper end of the rod 556. The upper end of the rod 556 is threaded as shown to adjustably receive spaced collars 674 and 676 which form the means for actuating the interlock switch device 750, the collars 674 and 676 being retained in adjusted position by lock screws 680 and 682 respectively.

The switch device 750 comprises a plurality of sets or pairs of leaf springs carrying the sets of electrical contacts 752, 754, 756, 758 and 760 and mounted upon a common block or blocks of insulation 684 attached to brackets 686 carried by a mounting plate 688, and mounting plate 688 also carrying an electrical panel board 690 which may be provided with the usual terminals permanently wired to the contacts of the switch device and by which the external connections to the switch may be varied as desired. The switch 750 comprises upper and lower parts 692 and 694 which are selectively operable by the roller 696 mounted on a crank arm 698 secured to a stud 700 carried by the mounting plate 688. The stud 700 also has fixed thereto a crank arm 702 provided at its outer end with a roller 704 lying in the path of movement of the actuating collars 674 and 676, and actuated thereby as the rod 556 approaches its upper and lower limits of movement. A counterweight 706 secured to the stud 700 or to the crank arms 698 or 702 as desired, balances the arms allowing the parts to assume the position shown in Fig. 17 when the roller 704 is not engaged by either of the collars 674 and 676. Figs. 18 and 19 illustrate the different positions to which the crank 698 and roller 696 and associated switch parts are moved by the collars 674 and 676 on operation of the actuator. It will be seen that when the roller 704 is not engaged by either of the actuating collars, the two sets of contacts 760 and 758 of the upper switch part 692 and the lower contacts 754 and 752 are open, while the other upper switch contacts 756 are in circuit closing position. As the gate valve approaches its closed position, the actuating collar 676 will engage the roller 704 and move the roller 696 downwardly, thereby moving the contacts 754 and 752 into circuit closing position (Fig. 19). As the gate valve reaches its normal limit of movement in the upward direction, the actuating collar 674 will engage the roller 704 and move the roller 696 upwardly to effect a closing of the two sets of contacts 760 and 758 of the switch part 692, but to break the circuit between the set of contacts 756 of this switch part, as seen in Fig. 18.

Fig. 25 discloses schematically the electrical control circuits for operating a system providing three of the hydraulic valve actuating units previously described, automatically in a predetermined sequence, or manually at will. For purposes of illustration the system is shown as comprising three-phase motors 708, 710 and 712, although it will be evident that any other alternating current motor may be used as well as any direct current motor, each of these motors being used as the motor 578 for driving the pump 580 of a hydraulic actuating unit. It is also obvious that the system may comprise any desired number of actuating units as the occasion may require.

In the manual operation of the system, the push button switches 714, 716 and 718 individually control the actuating magnets 720, 722 and 724 for the forward control switches 726, 728 and 730, while the push button switches 732, 734 and 736 individually control the actuating magnets 738, 740 and 742 of the reverse control switches 744, 746 and 748. For purposes of description, it will be assumed that initially the first actuator is standing in the valve closed position. In this case its interlock switch 750 will be in the position shown in Fig. 19 in which the pairs of contacts 752 and 754 of the lower set are in circuit closed positions as is also the contact pair 756 of the upper set, while the pairs of contacts 758 and 760 of the upper set are in circuit open position. The green indicating lamp 762 is thus energized through a circuit from the supply line L—1 through a wire 764, the lamp 762, the wire 765, contacts 756 and the wires 766 and 768 to the supply line L—3. This lamp 762 indicates that its valve is in closed position.

Upon depression of the valve opening switch 714, the circuit to the actuating magnet 720 is completed from the supply line L—3 through the wire 768, the wire 770, the push button 714, the wire 772, the actuating magnet 720 and the wire 764 to the supply line L—1. This magnet therefore actuates the forward control switch 726, the arms of which connect the motor leads 774, 776 and 778 to the supply lines L—1, L—2 and L—3 respectively through the wires 784, 782 and 780, and wires 786, 788 and 768.

The arm 790 of the switch 726 completes a holding circuit for the actuating magnet 720, this circuit being completed from the supply line L—1 through the wire 764, the actuating magnet 720, the wire 792, the arm 790, the wire 794, the interlock contact 756, wire 766 and wire 768 to the supply line L—3.

Simultaneously with the energization of the actuating magnet 720, the switch actuating magnet 796, which is connected in parallel with the magnet 720 is also energized and this magnet operates a switch 798 to complete a circuit for the red lamp 800 from the supply line L—1 through the wire 764, the lamp 800, the wire 802, the switch 798, the wire 804 and the wire 768, to a supply line L—3. The green lamp 762 and the red lamp 800 are now both lighted, thus indicating that the valve is between open and closed positions; thus, if for any reason the valve should for failure of any cause remain between the opened and closed positions, the illumination of both lamps will indicate such fact. Also these lamps may be used at a remote panel board for indicating the fact that the valve is moving.

As the valve actuator completes its normal opening stroke, the rod 556 operates the interlock switch 750; thus in the case of the first unit breaking the holding circuit for the actuating magnet 720 at the interlock contacts 756. The magnet 720 being thus deenergized, the forward control switch 726 is returned to open circuit position, breaking the motor circuit and the motor 708 stops rotating. The opening of the interlock contacts 756 also breaks the circuit to the green lamp 762 which is thus extinguished, but the circuit to the red lamp 800 remains energized through the switch 798 for the switch 798 is moved to its opposite positions only upon energization of the magnet 796 or the magnet 806. The red lamp 800 therefore now indicates that the valve is standing in opened position.

Upon operation of the valve closing push button switch 732 a circuit will be completed for the actuating magnet 738 of the reverse control switch 744, this circuit being completed from the supply line L—3 through the wire 808, the push button 732, the wire 906, the wire 810, the actuating magnet 738 and the wire 812 to the supply line L—1. Upon operation, the reverse control switch 744 connects the motor leads 774, 776 and 778 to the supply lines L—3, L—2 and L—1 respectively through the wires 768, 788 and 786. This completes the motor circuit and the motor begins to rotate in a valve closing direction. The holding circuit for the actuating magnet 738 is completed by the switch arm 814 from the supply line L—1 through the wire 812, the actuating magnet 738, the wire 816, the switch arm 814, the wire 818, the switch 798 which is in closed position, the wire 804 and the wire 768 to the supply line L—3.

As the valve actuator starts to move in a closing direction, it allows the interlock switch to return to its neutral position, closing contacts 756 and opening contacts 758 and 760. The closing of the contacts 756 again completes the circuit to the green lamp 762 so that this lamp is re-lighted and both lamps are again burning indicating to the operator that the valve actuator is in motion.

As the valve actuator completes its closing stroke, hydraulic pressure is built up in the cylinder of the pressure switch device 610, Fig. 14, and schematically represented in Fig. 25, thereby completing a circuit from the supply line L—1 through the wire 764, the magnet 806, the contacts of the pressure switch 610, the wire 822 and the wire 768 to the supply line L—3. The magnet 806 then moves the switch 798 to open circuit position, thereby breaking the holding circuit for the actuating magnet 738 stopping the motor and also breaking the circuit for the red lamp 800. The green lamp 762 remains energized, however, thus indicating that the valve has been brought to closed position. The valve actuator as it completes its closing stroke also actuates the lower part 694 of the interlock switch 750, as shown in Fig. 19, to close the contacts 754 and 752 for a purpose which will presently appear in connection with automatic operation.

The manually controlled circuits for the motors 710 and 712 for the second and third actuating units are identical to the manually controlled circuits for the motor 708 and need no further description other than to state that push button 716 initiates the operation of the second actuator unit in the valve opening direction, that push button switch 718 initiates operation of the third operating unit in a valve opening direction, while push buttons 734 and 736 initiate operation of the respective actuating units in a valve closing direction. The interlock switches 824 and 826 for the second and third actuator units are operated by their respective units in the same manner as interlock switch 750 of the first unit. Position indications are given for the second unit by lamps 828 and 830, corresponding to the lamps 762 and 800 of the first actuator unit, and similarly, lamps 832 and 834 provide position indications for the third unit. Pressure operated switches 836 and 838 for the second and third actuating units, corresponding to the pressure operated switch 610 for the first unit, control the limit of movement of the second and third actuating units in the valve closing direction.

In many installations of valve actuators it is necessary that the valves which are controlled shall be operated in some predetermined sequence, and that this sequential operation shall be accomplished automatically when once initiated or in continuous repetitious cycles of operation. It is also often necessary for the successful operation of such a system that a valve be not operated unless others of the valves are in certain positions. For purposes of illustration Fig. 25 discloses schematically one possible interlocking system as illustrative of the general principle of interlocking a system of such multiple actuating units, however, it is to be understood that by suitably varying the arrangement and timing of the automatic operating devices, various desired specific types of interlock control may be obtained.

In the illustrative example it is assumed that the three units shown are to be operated continuously in numerical sequence and at equal intervals. For example, assuming all valves to be closed, it is assumed that it is desired to first open the valve of the first unit, then after a predetermined interval open the second valve, and after the lapse of a like interval, open the third valve; and that it is further then desired after the lapse of the same interval to close the first valve, and successively at equal intervals, then close the second and third valves. The cycle of operation will then continue in the same order with all time intervals equal.

The illustrated interlocking system provides means for preventing any valve from being moved unless the other valves stand in the position that they should occupy at the time that the first mentioned valve should be moved. For example, the valve of the first unit may not be opened unless the valves of the second and third units are closed, nor may the valve of the first unit be closed unless the valves of the second and third unit are opened. Similarly the valve of the second unit may not be opened unless the valve of the first unit is opened and the valve of the third unit is closed, nor may the valve of this second unit be closed unless the valve of the first unit is closed and the valve of the third unit is opened. In like manner the valve of the third unit may not be opened unless the valves of the first and second units are both open, nor may the valve of the third unit be closed unless the valves of the first and second units are both closed.

The time intervals between the movements of the valve actuators are provided by a multi-contact switch mechanism comprising a plurality of interconnected switches, of which the contacts are shown in Fig. 25 as 840, 842, 844, 846, 848 and 850, there being in the assumed illustration two sets of such contacts for each of the actuator units. These contacts are actuated by a series of synchronously operated cams 852 to 862 which may, if desired, be mounted on and driven by a single shaft, which shaft may be continuously rotated by some suitable clock mechanism or synchronous electric motor, such as the three-phase synchronous motor 864. Each cam is provided with a contact actuating projection on its periphery and these cam projections are angularly related to each other in such a way that they will operate the contacts in the desired order and after the desired predetermined intervals. In the illustrative example, a complete cycle of operation of the valves is effected in one revolution of the common cam shaft, and since all intervals between the actuation of the units are to be equal, the projections on each of the cams 852, 856 and 860 which control the opening movement of the valve actuating units are displaced by the same angle of 60 degrees from the preceding cam, while each of the cams 854, 858 and 862 which control the closing movements of the actuating units is similarly displaced from the preceding cam by an angle of 60 degrees.

It should further be noted that since in the assumed example, the cycle is to be repeated after a lapse of an interval equal to the interval between the actuation of each valve in the cycle, the projection on the opening control cam 852 is displaced from the projection on the closing cam 862 by an angle of 60 degrees.

In the assumed example at the beginning of the cycle of operation, all valves are in closed position, and it is further assumed that the predetermined interval has elapsed since the closing of the third valve of the system. Therefore at this instant the opening cam 852 is in engagement with and closes the contacts 840. A shunt circuit is completed around the contacts of the opening push button 714 of the first unit from the contact on one side of the push button through the wire 864, the contacts 840, the wire 866, the contacts 752 of the interlock switch 750 which contacts are in closed position when the valve is closed (Fig. 19), the wire 868, the wire 870, the closed contacts 872 of the interlock switch 824, the wire 874, the closed contacts 876 of the interlock switch 826, the wire 878 and the wire 880 to the supply line L—3 to which the contact on the other side of the push button 714 is connected by the wires 768 and 770. The closing of the contact 840 therefore acts exactly as the closing of the push button switch 714, to complete an energizing circuit for the magnet 720 of the forward control motor switch 726, from line L—1 through wire 764, coil 720 and wire 722 to wire 864 and the remainder of the shunt circuit just specified, and thus the opening of the first unit is initiated automatically. Closing of contacts 840 also energize magnet 796 to close switch 798 so that the holding circuit for magnet 738 will be completed when 814 connects wires 816 and 818 upon subsequent closing of the circuit to 738.

This opening takes place, however, only if the second and third units are in valve closed position. If the valves of either of these second or third units are in open position or in partially open position, the contacts 872 and 876 of the interlock switch 824 or the interlock switch 826 will be opened and the above described shunt circuit around the push button 714 cannot be completed by the contacts 840.

As the cams continue to rotate the contact 840 will be reopened, but the motor 708 of the first actuating unit will continue in operation because of the holding circuit for the actuating magnet 720 completed by the arm 790 of the forward control switch 726 as previously described. The first actuating unit will be stopped at the end of its movement in the opening direction by the opening of the contacts 756 of the interlock switch 750 as previously described.

At the predetermined interval after the closing of the contacts 840 and the foregoing operations, the contacts 844 will be operated by the cam 856 and these contacts will complete a shunt circuit around the push button 716 of the second unit as well as closing the switch of this unit, the equivalent to switch 798 of the first unit. This circuit is completed from the one side of the push button 716 through the wire 882, the contacts 844, the wire 884, the now closed (Fig. 18) contacts 758 of the interlock switch 750, the wire 870, the closed contacts 872 of the interlock switch 824, the wire 874, the closed contacts 876 of the interlock switch 826, the wire 878 and the wire 880 to the supply line L—3 to which line the other side of the push button 716 is connected by the wires 888 and 886. Since this shunt circuit includes the contacts 758 of the interlock switch 750, it will be evident that the energizing circuit for the actuating magnet 722 of the forward control switch 728 of the second actuator unit will not be completed unless the first actuator unit has completed its opening operation. This shunt circuit also includes the contacts 876 of the interlock switch 826, thereby preventing energization of the second actuator unit for movement in the opening direction unless the valve of the third unit is closed.

The holding circuit for the actuating magnet 722 of the second unit, which holding circuit is identical to the holding circuit for the actuating magnet 720 of the first unit maintains this unit active after the momentarily closed contacts 844 have been opened, and after the contacts 872 of the interlock switch have been opened by the movement of the second valve from its closed position.

After the lapse of the predetermined interval, the contacts 848 are operated by the cam 860 to cause a shunt circuit around the push button 718 of the third unit. This shunt circuit is completed from one side of the push button 718 through the wire 890, the contacts 848, the wire 892, the wire 894, the now closed contacts 896 of the interlock switch 824, the wire 898, the closed contacts 760 of the interlock switch 750, the wire 900 and the wire 768 to the supply line L—3 to which the other side of the push button 718 is connected by the wires 902 and 904. Thus it will be seen that the third unit will be energized for movement in the opening direction only if the valves of the first and second units are in opened position.

The next operation of the cycle is the closing of the valve of the first unit and hence when the predetermined interval has elapsed following the opening of the third valve, the cam 854 will engage and close the contacts 842 to complete a shunt circuit around the push button switch 732 of this unit. This circuit is completed from one side of the push button switch 732 through the wire 906, the wire 908, contact 842, the wire 910, the now closed contacts 912 of the interlock switch 826, the wire 914, the wire 894, the closed contacts 896 of the interlock switch 824, the wire 898, the closed contacts 760 of the interlock switch 750, the wire 900 and the wire 768 to the supply line L—3 to which the other side of the push button 732 is connected by the wire 808. This shunt circuit energizes the coil 738 the same as if switch 732 were closed as previously described, but since this shunt circuit includes the contacts 896 and 912 of the interlock switches 824 and 826, it will be evident that the actuating magnet 738 for the reverse control switch 744 will not be energized unless the second and third valves are in their open position. Upon closure of the valve means of this unit, pressure will build up to operate the pressure switch 610 to close the circuit through magnet 806 which will open switch 798 to break the holding circuit for magnet 738.

The closing cam 858 next operates its contacts 846 to complete a shunt circuit around the push button 734 of the second unit, this circuit being completed from one side of the push button by the wire 916, the contacts 846, the wire 918, the wire 920, the closed contacts 754 of the interlock switch 750, the wire 922, the closed contacts 924 of the interlock switch 826, the wire 926, and the wire 880 to the supply line L—3 to which the push button 734 is connected at its other side. Thus it will be seen that the second actuator unit will be energized for closing movement the same as if push button 734 were operated, but only if contacts 754 of the interlock switch 750 and the contacts 924 of the interlock switch 826 of the third unit are in closed position. Since the contacts 754 will be closed only when the valve of the first unit is closed, and the contacts 924 will be closed only when the valve of the third unit is in open position, it will be seen that the valve in the second unit will be energized for closing movement only if the valve of the first unit is closed and the valve of the third unit is open. Completion of the closing movement of the valve of the second unit causes pressure switch 836 to open the holding circuit for magnet 740.

The cycle of operation is completed by the actuation of the contacts 850 by the cam 862. This completes a shunt circuit around the push button 736 of the third unit resulting in the actuation of coil 742 and in the closing of the third valve, the circuit being completed from one side of the push button through the wire 928, the wire 930, the contacts 850, the wire 932, the wire 934, the now closed contacts 936 of the interlock switch 824, the wire 938, the wire 920, the closed contact 754 of the interlock switch 750, the wire 922, the closed contacts 924 of the interlock switch 826, the wire 926 and the wire 880 to the supply line L—3 to which the other side of the push button is connected by the wire 940. Thus it will be seen that since this shunt circuit includes the contacts 754 of the interlock switch 750 and the contacts 936 of the interlock switch 824, the actuator of the third unit cannot be energized for movement in the closing direction if the valve of either the first or the second unit is opened or partially opened. Completion of the closing movement of the valve of the third unit causes pressure switch 838 to open the holding circuit for magnet 742.

The cycle of operation is now completed and all valves are returned to closed position. However, in the illustrated example, this cycle of operation will be repeated automatically upon the elapsing of the predetermined interval.

It should be noted that each actuator unit may be manually operated regardless of the positions of the other units, for the holding circuits and the circuits completed by the manual operation of the push buttons for each unit are independent of the interlocking circuits.

In the event that the automatic cycle of operations should be interrupted for any cause, the red and green signal lamps will indicate the positions of the several valves, whether open, closed or in intermediate position.

Referring to Fig. 20, and to Figs. 21, 22 and 23 of the drawings, structures are illustrated which may be utilized for sealing the valve when it is necessary to repack the same, and for releasably locking the valve in closed position to prevent it from working open due to vibration or other like causes.

To afford means for sealing the valve when it is necessary to repack it, the valve stem 530 is is formed with an annular shoulder or valve member 950, as seen in Figs. 20, 21 and 22 which is adapted to be brought into sealing engagement with a seating surface 951 formed on a bushing member 952. During normal opening movements of the valve, the valve is stopped in its uppermost or open position with the shoulder or valve member 950 spaced somewhat below the sealing surface 951. However, when it becomes necessary to repack the valve, for example, to replace the packing 546, the valve stem may be raised an additional amount to bring the valve member 950 into sealing engagement with the bushing member 952 thereby precluding leakage along the valve stem 530 during adjustment or replacement of the packing 546. Fig. 22 shows the parts in sealing position.

Fig. 23 illustrates the fluid circuits by which this sealing action may be effected. In this instance the ports 592 and 594 leading from the pump to the opposite ends of the actuator cylinders are the same, but in place of the port 600, as illustrated in Fig. 12, two ports 955 and 956 are provided at the upper end of the cylinder 568, these ports being connected by a passage 957. The port 956 is also provided with an adjustment screw 958 providing an adjustable restricted orifice. A conduit 959 leads from the ports to a control valve mechanism 608a which is generally similar to the control valve 608 previously described with reference to Fig. 14, but modified in certain particulars as will later be described. A conduit 960 leads from the control valve to a port or passage 961 which communicates with the cylinder 570 above the actuator piston 574a, which piston is also generally similar to the piston 574 previously described but modified in certain particulars hereinafter to be pointed out. A by-pass conduit 962 connects the conduits 959 and 960, this by-pass conduit being provided with a ball check valve 963 which permits liquid flow through conduit 962 from the conduit 960 to the conduit 959, but prevents reverse flow therethrough.

When it is desired to seal the valve stem 530 for repacking purposes, the manually operable valve opening switch 714, Fig. 25, or switches 716 and 718 depending upon which valve unit is to be repacked, may be held in closed position either manually or by a suitable latch device whereby to maintain the energization of the pump motor even though the interlock switch 750 is operated as the valve reaches its normal open position. The interlock switch breaks the holding circuit for the motor, but if the manually operable switch 714 is maintained closed, the pump motor will continue to run. Normally when the actuator piston 572 is in valve open position, the skirt portion thereof seals the port 956 so that this port remains inoperative. However, when the actuator piston is raised the additional amount to bring the valve member 950 into sealing engagement with the bushing 952, the lower skirt of the actuator piston 572 is raised above the port 956 allowing the port to become operative as an exhaust passage. Under these conditions the liquid which is being delivered by the pump to the actuator cylinder 568 below the piston 572 by means of the port 594 and the passageway 602 will be exhausted from the cylinder through port 956, to ports 957 and 955, from port 955 through the cylinder chamber 568 above the upper face of the actuator piston, and by means of port 592 back to the inlet side of the pump. The orifice device 958 may be adjusted to provide sufficient restriction in the exhaust port to maintain a desired liquid pressure underneath the actuator piston 572 thereby holding the valve member 950 in desired sealing pressure engagement with the bushing member 952. So long as the switch 714 remains operated, the valve 950 will be continuously maintained in sealing position for valve repacking purposes.

Referring further to Fig. 23, the means by which the main valve member 528 is releasably locked in closed position comprises a locking pin 965 slidable within the end cap or base member 564a of the actuator cylinder. The locking pin is guided by a key pin 966 and engageable at its outer end with a tapered surface 967 formed on the piston 574a and at its inner end with a cutaway portion or notch 968 formed in the piston rod 548. As the piston 574a is forced downwardly after the piston rod 548 has been moved to its lowermost valve-closing position, the locking pin 965 is thrust into the notch 968 releasably holding the piston rod in position against inadvertent movement due to vibration or the like. Due to the shaping of notch 968, the piston rod 548 may be moved upwardly even while the locking pin remains in operative position, in the event that the piston rod is subjected to the greater forces induced by the expansion of the valve parts due to increased temperature or the like. The locking pin 965 thus provides means for retaining the valve 528 in closed position against vibration or other inadvertent unseating forces, but the locking action of the pin may yield to prevent breakage or scoring of the parts as expansion occurs due to heating or temperature increases. It is to be noted that the notch 968 is of greater vertical extent than the thickness of the locking pin, thus accommodating for variations in the actions of the parts.

In the operation of the locking device, as liquid is delivered from the pump through port 594 the power piston 574a will be raised into engagement with the actuator or traverse piston 572 to force the valve loose from its seat in the manner previously described with reference to Fig. 12. This movement of the power piston releases the locking pin 965 so that the traverse piston 572 is free to continue the upward movement of the valve to its open position. During the upward movement of the piston 574a the liquid in cylinder 570 above the piston is exhausted into the cylinder 568 above traverse piston 572 by means of the passageways 961, 962 and 955, and the liquid in the cylinder 568 above the piston 572 is returned to the pump through the port 592, until the actuator piston is stopped by the operation of the limit switch mechanism all as previously described.

As the pump is reversely operated to lower or close the valve, liquid is delivered to cylinder 568 above the traverse piston 572 through the port or passage 592. At this time the check valve 963 and the control valve 608a preclude the passage of liquid to the port 961 so that the power piston 574a remains in its uppermost position. The locking pin 965 is not operated and the traverse piston 572 is free to lower the valve 528 into its closed or seated position. During the downward movement of the traverse piston the liquid in the cylinder 568 below the piston is returned to the pump by means of passageways 602 and 594.

As the valve reaches seated position, pressure builds up in the cylinder 568 above the traverse piston building up pressure in the pipe line 959 and causing the operation of control valve 608a in the manner previously described. However, in this instance the control valve has two pressure operated positions. As liquid pressure is applied to it it first moves to a position wherein the stem member 620 moves sufficiently to the right, as seen in Fig. 23, to permit the passage of liquid from the conduit 959 into a chamber 970 and thence into the conduit 960 from which it passes through the conduit 961 to the cylinder 570 on the upper side of the power piston 574a. This movement of the control valve 608a is not sufficient to allow the passage of liquid to the switch actuating port 634. The power piston is thus moved down after the valve has been closed by the traverse piston, actuating the locking pin 965 to lock the valve in closed position. During this movement of the power piston 574a the liquid in cylinder 570 below the piston is returned to the pump by passage 594. It is to be noted that there is a loss of pressure as the fluid goes through the spring-pressed control valve 608a with the result that the initial pressure acting on the top of the power and locking piston 574a is less than the fluid pressure acting on the top of the traverse piston 572, further insuring that the valve will be fully closed before the locking pin becomes operative. As the power piston is stopped by the locking pin, pressure further builds up on the outlet side of the pump and within the conduit 959 causing the further movement of the control valve 608a to the right in which position the sealing surface 626 becomes inoperative and liquid passes to the port 634 and to the pressure chamber 638 of the control switch member 610 breaking the circuit to the pump motor in the manner previously described. The tension adjustment of spring 622 will determine the locking force which will be applied by the piston 574a to the locking pin. The angularity of the piston surface 967 which engages the locking pin is such that the pin is retained in locking position even after actuating pressure upon the power piston has been relieved.

In Fig. 24 a modified form of locking pin arrangement is shown, the parts being shown, as in Fig. 23, with the valve in seated position. In this instance the locking pin 965a is beveled on its end as indicated at 980, and the notch cut in the piston rod 548 is of general V shape, the tapered surfaces of the notch being somewhat longer than those of the pin. With this arrangement the inward thrust of the locking pin produces an appreciable thrust of the piston rod downwardly to seat the valve, but the arrangement will still permit upward movement of the piston rod due to valve expansion or the like, and to this end the tapered surface 967a on the piston may be of reduced angularity, permitting the piston to be more readily forced upwardly by an outward thrust, to the right as seen in Fig. 24, applied through the locking pin. Such form of construction may be desirable in certain instances.

In certain instances it may be desirable to effect the shifting of the valves to various intermediate positions of adjustment, and to indicate accurately the adjusted valve position, as for example in instances wherein the valve or valves may be used for throttling control and the like. Such an arrangement, in a remote control installation, is illustrated in Figs. 26 and 27.

Referring to Fig. 26, a structure is illustrated generally similar to Fig. 12 with the exception that a simplified limit switch 982 is employed, in replacement of the switch structure 558, previously described; which limit switch is actuated as the valve reaches fully opened position by a dog 984 adjustably carried on a dog bar 986 which is in turn carried by the valve stem bracket 553. The bracket 553 also supports a rack 988 adapted to have meshing engagement with and actuate a gear 990 connected to the rotor 992 of a Selsyn transmitter 994. The stator winding 996 of the Selsyn transmitter is interconnected with the stator 998 of the Selsyn receiver 1000, the rotor 1002 of which is provided with a suitable indicator or pointer as indicated at 1004. The Selsyn receiver 1000 may be formed as a part of an operator's panel board 1006 located at a suitable operating station, remote from the valve structure.

Referring to Fig. 27, it will be seen that the starting coil 1008 for initiating the opening movement of the pump motor, and corresponding to the coil 210 previously described, is under the conjoint control of a manual "Open" switch 1010 and the limit switch 982, the arrangement being such that the coil is energized only when both switches are closed. The starting coil 1012 for initiating the closing movement of the pump motor is under the conjoint control of a manual "Close" switch 1014 and the pressure switch 610, previously described, the arrangement again being such that the coil is energized only when both switches are closed. As will be understood, the motor circuit switches operated by the starting coils 1008 and 1012 may be suitably spring-retracted, as diagrammatically indicated at 1016, so that the pump motor 200 remains energized only during such time as one or the other of the coils 1008 or 1012 is energized. As will be further understood, the manually operable "Open" and "Close" switches 1010 and 1014 may be suitably interconnected so that only one of the switches may be closed at one time.

Referring further to Fig. 27, it will be seen that the rotors 992 and 1002 of the Selsyn devices are energized from the power lines L—1 and L—3, and that the stators 996 and 998 are interconnected, in the manner appropriate to Selsyn or self-synchronous transmitter and receiver structures, so that any rotation of the transmitter rotor 992 is accurately transmitted to the receiver rotor 1002 and the indicator 1004 connected therewith.

It will be seen that by reason of the structures provided in Figs. 26 and 27 the operator may, from a remote station, adjustably shift the valve to any desired position. The valve will be opened only so long as the "Open" switch is held depressed, and when the valve reaches fully open position the limit switch 982 opens to stop further valve movement. Similarly the valve will be moved towards closed position during such time as the "Close" push button 1014 is held depressed, and when the valve reaches fully closed position, and is forced into closed position at the pressure setting of switch 610, the latter opens to disconnect the pump motor and stop further operation of the pump. The Selsyn indicator 1004 provided in the operator's remote station, provides an accurate indication of the valve position at all times. As will be understood, the control and indicating arrangements of Figs. 26 and 27 may be added to and used with the manual and automatic control system previously described in reference to Fig. 25.

Claims to the pump structure, and to the plurality of hydraulically actuated motor means and the multiple and interconnected control thereof, are not presented herein, but are being presented in divisional applications hereof.

It is obvious that various changes may be made in the specific embodiments of the invention set forth for purposes of illustration without departing from the spirit thereof. Accordingly the invention is not to be limited to the precise embodiments heretofore shown and described, but only as indicated in the following claims.

The invention is hereby claimed as follows:

1. A hydraulic actuator mechanism comprising a gear pump, a fluid reservoir, a reciprocable hydraulic actuator including a piston and cylinder construction, a piston rod connected to the piston and projecting from one end of the cylinder, said gear pump being provided with a housing having inlet and outlet ports and chambers interconnecting said ports, said chambers housing the gear elements of the pump, conduits connecting the inlet and outlet ports of the pump to the hydraulic actuator on opposite sides of the piston, and means including an auxiliary passageway through said pump housing and opening into a gear element chamber between said ports for connecting a gear element of the pump to the fluid reservoir independently of said ports, said means including said auxiliary passageway serving to compensate for the differences in piston displacement areas on opposite sides of the piston.

2. A hydraulic actuator mechanism comprising a reciprocable hydraulic actuator, an element to be shifted, means for connecting the element to the hydraulic actuator whereby to shift the element in accordance with the movements of said actuator, said reciprocable hydraulic actuator comprising a cylinder and a pair of piston members operable therein, one of said pistons being a traverse piston movable through a given range of travel to shift said element, the other of said pistons being a power piston movable through a smaller range of travel and adapted to engage the traverse piston during a given travel to supplement the power of the traverse piston, a fluid pump, and means including said pump and conduits connecting the pump to the actuator on opposite sides of both pistons for supplying fluid from said pump to said actuator at corresponding sides of said pistons and discharging it from the other sides of said pistons and conversely, to effect movement of said pistons in one direction or in an opposite direction selectively.

3. A hydraulic actuator mechanism comprising a reciprocable hydraulic actuator, a liquid pump hydraulically connected to the actuator for supplying fluid to the actuator to propel the actuator in one direction or selectively in an opposite direction, a valve, means for connecting the valve to the hydraulic actuator whereby to shift the valve in accordance wth the movements of the actuator, said actuator including piston means for applying a given force to the valve to effect its movements between open and closed positions and other piston means for applying a greater initial force to the valve in the opening direction and having a limited free initial movement to attain speed prior to the application of force therefrom to said valve.

4. A hydraulic actuator mechanism comprising a power source, a fluid pump adapted to be actuated by the power source, a reciprocable hydraulic actuator hydraulically connected with the pump for actuation thereby, a valve, and means for connecting the valve to the hydraulic actuator whereby to shift it in accordance with the movements of the actuator, said actuator being constructed to apply to the valve a power action sufficient to move the valve to and from open position and to a fully closed position, and including means for applying a greater power action to the valve to initiate the opening movement, said actuator applying to the valve as it approaches closed position a force of increasing value, and means including a hydraulic pressure maintaining device for establishing in said actuator a predetermined final valve closing hydraulic pressure to determine the value of said increased force thus applied to the valve to move the valve to its closed position.

5. A hydraulic actuator mechanism comprising a power source, a fluid pump adapted to be actuated by the power source, a reciprocable hydraulic actuator hydraulically connected with the pump for actuation thereby, a valve, and means for connecting the valve to the hydraulic actuator whereby to shift it in accordance with the movements of the actuator, said actuator including means for applying a given power action to open and close the valve, and for applying a greater power action at the opening movement, and means for arresting the power action when the valve has been closed by a given force, said arresting means comprising a pressure switch actuated by fluid pressure from the actuator.

6. A hydraulic actuator mechanism comprising a power source, a fluid pump adapted to be actuated by the power source, a reciprocable hydraulic actuator hydraulically connected with the pump for actuation thereby, a valve, and means for connecting the valve to the hydraulic actuator whereby to shift it in accordance with the movements of the actuator, said actuator including means for varying the area thereof upon which the propelling fluid is operative for applying a given power action to open and close the valve, and for applying a greater power action at the initiation of the opening movement, and means for arresting the power action when the valve has been closed by a given force, said arresting means being constructed and arranged to operate at a given pressure in said actuator.

7. A hydraulic actuator mechanism for valves comprising a fluid pump, a reciprocable hydraulic actuator hydraulically connected with the pump for actuation thereby, a valve structure including a valve, a valve stem for connecting the valve to the hydraulic actuator to effect shifting of the valve in accordance with the movements of the actuator, a packing for said valve stem, a sealing member on the valve stem, control means for causing operation of the pump and hydraulic actuator to move said valve into a position in which said sealing member engages a cooperating fixed sealing member in said valve structure whereby to seal the valve during replacement or repair of said packing, and means for maintaining a predetermined pressure of fluid in said actuator to hold the valve in said position.

8. A hydraulic actuator mechanism for valves comprising a power source, a fluid pump adapted to be actuated by the power source, a reciprocable hydraulic actuator hydraulically connected with the pump for actuation thereby, a valve structure including a valve, a valve stem for connecting the valve to the hydraulic actuator to effect shifting of the valve in accordance with the movements of the actuator, a packing for said valve stem, a sealing member on the valve stem, means for operating the hydraulic actuator to bring said sealing member into engagement with a cooperating fixed sealing member in said valve structure whereby to seal the valve during replacement or repair of said packing, and means associated with the hydraulic actuator for maintaining said sealing members in engagement with a predetermined pressure continuously during packing replacement or repair operations.

9. A hydraulic actuator mechanism for valves comprising a power source, a fluid pump adapted to be actuated by the power source, a reciprocable hydraulic actuator hydraulically connected with the pump for actuation thereby, a valve structure including a valve, a valve stem for connecting the valve to the hydraulic actuator to effect shifting of the valve in accordance with the movements of the actuator, a packing for said valve stem, a sealing member on the valve stem, means for operating the hydraulic actuator to bring said sealing member into engagement with a cooperating fixed sealing member in said valve structure whereby to seal the valve during replacement or repair of said packing, and means including a restricted exhaust orifice associated with the hydraulic actuator for maintaining said sealing members in engagement with a predetermined pressure continuously during packing replacement or repair operations.

10. A hydraulic actuator mechanism comprising a power source, a fluid pump adapted to be actuated by the power source, a reciprocable hydraulic actuator hydraulically connected with the pump for actuation thereby, an element to be shifted, means for connecting the element to the hydraulic actuator whereby to shift the element in accordance with the movements of said actuator, means for locking the element in one of its positions, fluid actuated means in said actuator for operating said locking means, and pressure actuated means responsive to the pressure of the fluid in the actuator and controlling the supply of fluid from said pump to said fluid actuated means to supply operating fluid to said fluid actuated means as the pressure of the fluid in said actuator rises on completion of the movement of the actuator in one direction.

11. A hydraulic actuator mechanism comprising a power source, a fluid pump adapted to be actuated by the power source, a reciprocable hydraulic actuator hydraulically connected with the pump for actuation thereby, a machine element to be shifted, means for connecting the machine element to the hydraulic actuator whereby to shift the element in accordance with the movements of said actuator, means controlled by the hydraulic actuator for locking the element in one of its positions, said locking means including a locking member engageable by a part of the hydraulic actuator, and means for arresting the hydraulic actuator when the locking member has been moved into locking position with a predetermined force.

12. A hydraulic actuator mechanism comprising a power source, a fluid pump adapted to be actuated by the power source, a reciprocable hydraulic actuator hydraulically connected with the pump for actuation thereby, a machine element to be shifted, means for connecting the machine element to the hydraulic actuator whereby to shift the element in accordance with the movements of said actuator, means controlled by the hydraulic actuator for locking the element in one of its positions, said locking means including a locking member engageable by a part of the hydraulic actuator, means for arresting the hydraulic actuator when the locking member has been moved into locking position with a predetermined force, and means for adjusting the force at which the arresting means becomes operable.

13. A hydraulic actuator mechanism for valves comprising a power source, a fluid pump adapted to be actuated by the power source, a reciprocable hydraulic actuator hydraulically connected with the pump for actuation thereby, a valve, means for connecting the valve to the reciprocable hydraulic actuator whereby to shift the valve in accordance with the movements of the actuator, said actuator including a cylinder having a traverse piston and a locking piston therein, a locking device operated by the locking piston for releasably locking the valve in closed position, and means for rendering said locking piston ineffective to operate said device during movement of said valve by said traverse piston from an open position to a closed position and thereafter rendering said locking piston effective to operate said device.

14. A hydraulic actuator mechanism for valves comprising a power source, a fluid pump adapted to be actuated by the power source, a reciprocable hydraulic actuator hydraulically connected with the pump for actuation thereby, a valve, means for connecting the valve to the reciprocable hydraulic actuator whereby to shift the valve in accordance with the movements of the actuator, said actuator including a cylinder having a traverse piston and a locking piston therein, locking devices operated by the locking piston for locking the valve against movement, and control mechanism for initiating operation of the locking piston after the traverse piston has moved the valve into closed position and for arresting the actuator after the operation of the locking piston.

15. A hydraulic actuator mechanism for valves comprising a power source, a fluid pumping means adapted to be actuated by the power source, a reciprocable hydraulic actuator hydraulically connected with the pumping means for actuation thereby, a valve, means for connecting the valve to the reciprocable hydraulic actuator whereby to shift the valve in accordance with the movements of the actuator, said actuator including a traverse piston and a locking piston, locking devices operated by the locking piston for locking the valve against movement, control mechanism for initiating operation of the locking piston after the traverse piston has moved the valve into closed position and for arresting the actuator after the operation of the locking piston, said control mechanism including a control valve shiftable by the fluid pressure within the hydraulic actuator, a control switch for controlling the operation of the actuator, and means controlled by the control valve for supplying operative fluid from said pumping means to said switch.

16. A hydraulic actuator mechanism comprising a fluid reservoir, a hydraulic actuator having reciprocable piston means, a pump having inlet and outlet ports and conduits hydraulically connecting the actuator on opposite sides of the piston means to said inlet and outlet ports independently of said reservoir for propelling said piston means first in one direction and then in the opposite direction, an element to be shifted, means for connecting said element to the piston means of the hydraulic actuator whereby to shift the element in accordance with the movements of said piston means, said actuator being constructed to apply a given operating force to said element in one direction of travel when fluid is supplied from the pump to the actuator on one side of the piston means and withdrawn to the pump from the actuator on the opposite side of the piston means and to apply a greater operating force to said element in the opposite direction of travel when fluid is supplied from the pump to the actuator on said opposite side of the piston means and withdrawn to the pump from the actuator on said one side of the piston means, said pump having a pumping element in a chamber interconnecting said pump ports, and an auxiliary passageway opening into the pumping element chamber between said ports and connecting a pumping element of the pump to the reservoir to discharge into the reservoir a portion of the fluid received from said actuator upon movement of said actuator in said one direction and to add fluid from the reservoir to the fluid received from the actuator upon movement of the actuator in the said opposite direction.

17. A hydraulic actuator mechanism comprising a gear pump, a fluid reservoir, a reciprocable hydraulic actuator including a piston and cylinder construction, a piston rod connected to the piston and projecting from one end of the cylinder, said gear pump being provided with a housing in which is mounted a pair of cooperating gear elements in chambers interconnecting the inlet and outlet sides of the pump and being provided with conduits connecting the inlet and outlet sides of the pump to the hydraulic actuator on opposite sides of the piston, and auxiliary passageways through said housing and opening into the gear element chambers between said inlet and outlet sides and connecting both gear elements of the pump to the fluid reservoir, said auxiliary passageways serving to compensate for the differences in piston displacement areas on opposite sides of the piston.

18. A hydraulic actuator mechanism comprising a reversible pump, a fluid reservoir, a reciprocable hydraulic actuator including a piston and cylinder construction, a piston rod projecting from one side only of the piston and out of the cylinder, said pump having a housing forming a pumping chamber, a gear pumping element in said chamber, said gear element having radial passageways formed therein, conduits connecting the opposite sides of the pump to the hydraulic actuator on opposite sides of the piston, means including an auxiliary passageway communicating with said radial passageways for connecting one of said conduits to the fluid reservoir when said conduit is connected to the inlet side of the pump and the return side of the actuator, a fluid actuated valve for controlling fluid flow through said auxiliary passageway, and means for supplying operating fluid to said valve from one of said conduits to automatically shift said valve by the pressure conditions in the actuator.

19. A hydraulic actuator mechanism comprising a reversible pump, a fluid reservoir, a reciprocable hydraulic actuator including a piston and cylinder construction, a piston rod projecting from one side only of the piston and out of the cylinder, said pump having a housing forming a pumping chamber, a gear pumping element in said chamber, said gear element having radial passageways formed therein, conduits connecting the opposite sides of the pump to the hydraulic actuator on opposite sides of the piston, means including a pair of auxiliary passageways communicating with said radial passageways for respectively connecting said conduits to the fluid reservoir when connected to the inlet side of the pump and the return side of the actuator, a fluid actuated valve for selectively controlling fluid flow through said auxiliary passageways, and means for supplying operating fluid to said valve from said conduits when connected to the outlet side of the pump to automatically shift said valve by the pressure conditions in the actuator.

20. A hydraulic actuator mechanism comprising a pump, a fluid reservoir, and a device to be actuated by the pump, said pump having inlet and outlet ports and a pumping chamber interconnected therebetween, conduits interconnecting the inlet and outlet ports respectively with said device to be actuated, said device being arranged to return to the inlet of the pump during a given operation thereof a quantity of fluid different from the quantity delivered through the pump outlet, and auxiliary passageway means interconnecting said pumping chamber between the inlet and outlet ports and the reservoir, said means serving to transmit during pump operation a quantity of fluid equal to the differential between the fluids passing through the pump inlet and outlet ports.

21. A hydraulic actuator mechanism comprising a pump, a fluid reservoir, and a device to be actuated by the pump, said pump having inlet and outlet ports and a pumping chamber interconnected therebetween, conduits interconnecting the inlet and outlet ports respectively with said device to be actuated, said device being arranged to return to the inlet of the pump during a given operation thereof a quantity of fluid different from the quantity delivered through the pump outlet, auxiliary passageway means interconnecting said pumping chamber and the reservoir, and a valve for selectively controlling the operative functioning of said means, said means serving to transmit during pump operation a quantity of fluid equal to the differential between the fluids passing between the pump inlet and outlet ports.

22. A hydraulic actuator mechanism comprising a pump, a fluid reservoir, and a device to be actuated by the pump, said pump having inlet and outlet ports and a pumping chamber interconnected therebetween, conduits interconnecting the inlet and outlet ports respectively with said device to be actuated, said device being arranged to return to the inlet of the pump during a given operation thereof a quantity of fluid different from the quantity delivered through the pump outlet, auxiliary passageway means interconnecting said pumping chamber and the reservoir, and a valve shifted by the pressure delivery of the pump for selectively controlling the operative functioning of said means, said means serving to transmit during pump operation a quantity of fluid equal to the differential between the fluids passing between the pump inlet and outlet ports.

23. A power operated hydraulic actuator mechanism for valves comprising a reversible electric motor, a reversible pump operated thereby, a hydraulic actuator including a reciprocable operating member adapted for connection to a valve member to be shifted, conduits interconnecting the hydraulic actuator and pump, a control circuit for the motor, a plurality of control switches for controlling the energization of said control circuit, said switches including a manually operable start switch and a pair of switches responsive to the shifting of the actuator in opposite directions, at least one of said last named switches being responsive to pressure conditions within the actuator as the actuator moves to valve closing position, and means for applying a predetermined greater power action to the actuator, if required, as the actuator is shifted away from valve closing position.

24. A power operated hydraulic actuator mechanism for valves comprising a reversible electric motor, a reversible pump operated thereby, a hydraulic actuator including a reciprocable operating member adapted for connection to a valve member to be shifted, conduits interconnecting the hydraulic actuator and pump, an energizing circuit for the motor, means for applying a predetermined power action to the actuator as the actuator is shifted to valve closing position, and means for applying a predetermined greater power action to the actuator, if required, as the actuator is shifted away from valve closing position.

25. A power operated hydraulic actuator mechanism for valves comprising a reversible electric motor, a reversible pump operated thereby, a hydraulic actuator including a reciprocable operating member adapted for connection to a valve member to be shifted, conduits interconnecting the hydraulic actuator and pump, an energizing circuit for the motor, means including a pressure responsive switch mechanism for applying a predetermined power action to the actuator as the actuator is shifted to valve closing position, and means for applying a predetermined greater power action to the actuator, if required, as the actuator is shifted away from valve closing position.

26. A power operated hydraulic actuator mechanism for valves comprising a reversible electric motor, a reversible pump operated thereby, a hydraulic actuator including a reciprocable operating member adapted for connection to a valve member to be shifted, conduits interconnecting the hydraulic actuator and pump, an energizing circuit for the motor, and means including a pressure switch for arresting movement of the hydraulic actuator as the valve member is shifted into closed position, and for maintaining the valve member in closed position until the motor is energized in valve opening direction.

27. A power operated hydraulic actuator mechanism for valves comprising a reversible electric motor, a reversible pump operated thereby, a hydraulic actuator including a reciprocable operating member adapted for connection to a valve member to be shifted, conduits interconnecting the hydraulic actuator and pump, an energizing circuit for the motor, means including a pressure switch for disabling the motor as the hydraulic actuator is moved into valve closing position, and means for maintaining a thrusting force upon the operating member so as to hold the valve in closed position until current is applied to the motor in a valve-opening direction.

28. A power operated hydraulic actuator mechanism for valves comprising a reversible electric motor, a reversible gear pump operated thereby, a hydraulic actuator including a reciprocable piston adapted for connection to a valve member to be shifted, conduits interconnecting the inlet and outlet ports of the gear pump respectively to the hydraulic actuator on opposite sides of the piston, means connecting with said conduits when on the return side of the actuator and the inlet side of the pump for selectively adding to or subtracting from the fluid supply, an energizing circuit for the motor, and a plurality of control switches for controlling the action of said energizing circuit, said switches including a manually operable switch and a pair of switches responsive to the shifting of the actuator piston in its opposite directions of travel.

29. A power operated hydraulic actuator mechanism for valves comprising a reversible electric motor, a reversible pump operated thereby, a hydraulic actuator including a reciprocable operating member adapted for connection to a valve member to be shifted, conduits interconnecting the hydraulic actuator and pump, a control circuit for the motor, a plurality of control switches including a switch responsive to the pressure in the actuator for controlling the action of said control circuit, and electrical indicator means responsive to the operation of said switches and to the movement of the valve for indicating the valve position.

30. A power operated hydraulic actuator mechanism for valves comprising a reversible electric motor, a reversible pump operated thereby, a hydraulic actuator including a reciprocable operating member adapted for connection to a valve member to be shifted, conduits interconnecting the hydraulic actuator and pump, a control circuit for the motor, a plurality of control switches including a switch responsive to the pressure in the actuator for controlling the action of said control circuit, and a pair of signal lamps responsive to the operation of said switches and to the movement of the valve as the valve reaches its extremities of travel in opposite directions.

31. A power operated hydraulic actuator mechanism for valves comprising a reversible electric motor, a reversible pump operated thereby, an energizing circuit for the motor, a hydraulic actuator including a cylinder and a reciprocable piston therein having a piston rod projecting from the cylinder at one end thereof and adapted for connection to a valve member to be shifted, conduits interconnecting the hydraulic actuator on opposite sides of the piston respectively with the opposite sides of the pump, a reservoir, and means for supplying liquid from the reservoir to the pump as the valve is shifted toward closed position and for diverting liquid from the pump to the reservoir as the valve is shifted toward open position to compensate for the differential piston rod area.

ERNEST J. SVENSON.

REFERENCES CITED

The following references are of record in the file of this patent:

UNITED STATES PATENTS

| Number | Name | Date |
|---|---|---|
| 855,385 | Churchill | May 28, 1907 |
| 992,139 | Poche | May 9, 1911 |
| 1,187,946 | Vincent | June 20, 1916 |
| 1,552,768 | Smith | Sept. 8, 1925 |
| 1,558,002 | Ferris | Oct. 20, 1925 |
| 1,560,705 | Mayer | Nov. 10, 1925 |
| 1,616,841 | Beebe | Feb. 8, 1927 |
| 1,643,753 | Slattery | Sept. 27, 1927 |
| 1,760,915 | Robson | June 3, 1930 |
| 1,835,952 | Kieser | Dec. 8, 1931 |
| 1,836,813 | Rankin | Dec. 15, 1931 |
| 1,851,502 | Ferris et al. | Mar. 29, 1932 |
| 1,885,077 | Cannon | Oct. 25, 1932 |
| 1,886,518 | Beckwith | Nov. 8, 1932 |
| 1,888,392 | Penick et al. | Nov. 22, 1932 |
| 1,916,433 | Muller | July 4, 1933 |
| 1,922,874 | Tymstra | Aug. 15, 1933 |
| 1,948,951 | Walker | Feb. 27, 1934 |
| 1,955,154 | Temple | Apr. 17, 1934 |
| 1,959,071 | Van Patter et al. | May 15, 1934 |
| 2,009,487 | Ernst et al. | July 30, 1935 |
| 2,055,815 | Dewey | Sept. 29, 1936 |
| 2,103,984 | Indge | Dec. 28, 1937 |
| 2,114,005 | Tyler | Apr. 12, 1938 |
| 2,149,864 | Osborne | Mar. 7, 1939 |
| 2,157,327 | Durham | May 9, 1939 |
| 2,163,982 | Mercier | June 27, 1939 |
| 2,191,125 | Evans et al. | Mar. 12, 1940 |
| 2,203,233 | Panish | June 4, 1940 |
| 2,210,284 | Dinzl | Aug. 6, 1940 |
| 2,221,121 | Wallace | Nov. 12, 1940 |
| 2,221,979 | Levy | Nov. 19, 1940 |
| 2,354,888 | Smith | Aug. 1, 1944 |

FOREIGN PATENTS

| Number | Country | Date |
|---|---|---|
| 750,179 | France | May 22, 1933 |